United States Patent [19]
Nishimura et al.

[11] Patent Number: 5,783,278
[45] Date of Patent: Jul. 21, 1998

[54] REINFORCING WOVEN FABRIC AND METHOD AND APPARATUS FOR MANUFACTURING THE SAME

[75] Inventors: Akira Nishimura, Ehime; Kiyoshi Homma, Omihachiman; Ikuo Horibe, Matsuyama, all of Japan

[73] Assignee: Toray Industries, Inc., Japan

[21] Appl. No.: 737,196

[22] PCT Filed: Sep. 7, 1995

[86] PCT No.: PCT/JP95/01781

§ 371 Date: Nov. 6, 1996

§ 102(e) Date: Nov. 6, 1996

[87] PCT Pub. No.: WO96/27701

PCT Pub. Date: Sep. 12, 1996

[30] Foreign Application Priority Data

Mar. 8, 1995 [JP] Japan ................................. 7-078274

[51] Int. Cl.[6] .................. B32B 5/02; B32B 5/06; B32B 5/28; D03D 15/00
[52] U.S. Cl. .......................... 428/102; 139/11; 139/457; 428/337; 428/340; 428/542.8; 428/902; 442/60; 442/108; 442/179; 442/186
[58] Field of Search .................. 428/102, 337, 428/340, 542.8, 902; 442/60, 108, 179, 186; 139/11, 457

[56] References Cited

U.S. PATENT DOCUMENTS

| | | | |
|---|---|---|---|
| 4,320,160 | 3/1982 | Nishimura et al. | 428/107 |
| 4,534,919 | 8/1985 | McAliley et al. | 264/29.2 |
| 4,714,642 | 12/1987 | McAliley et al. | 428/113 |
| 5,056,567 | 10/1991 | Kitazawa | 139/457 |
| 5,281,470 | 1/1994 | Kobayashi et al. | 428/241 |
| 5,288,545 | 2/1994 | De Decker | 428/226 |
| 5,396,932 | 3/1995 | Homma et al. | 139/420 A |
| 5,455,107 | 10/1995 | Homma et al. | 428/229 |

Primary Examiner—James C. Cannon
Assistant Examiner—Blaine R. Copenheaver
Attorney, Agent, or Firm—Austin R. Miller

[57] ABSTRACT

This invention provides a reinforcing woven fabric using as weaving threads flat and substantially nontwisted multifilaments of reinforcing fiber having less than 0.5 wt. % of sizing agent provided thereto and a binding property of 400–800 mm in hook drop value, and a method and an apparatus for manufacturing a reinforcing woven fabric by weaving the multifilaments of reinforcing fiber as warps and wefts. A reinforcing woven fabric having a small thickness and an extremely high covering factor and capable of indicating a high strength can be obtained at a low cost as a substrate for reinforcing composite materials.

39 Claims, 8 Drawing Sheets

REINFORCING WOVEN FABRIC AND METHOD AND APPARATUS FOR MANUFACTURING THE SAME

TECHNICAL FIELD OF THE INVENTION

The present invention relates to a reinforcing woven fabric indicating excellent properties for fiber reinforced composite materials and method and apparatus for manufacturing the same, and specifically to a reinforcing woven fabric using flat reinforcing filamentary yarn.

BACKGROUND ART OF THE INVENTION

In fiber reinforced composite materials, particularly, fiber reinforced plastics (hereinafter, referred to as "FRP"), a reinforcing woven fabric formed as a woven fabric using carbon fiber yarn, glass fiber yarn, polyaramide fiber yarn, etc. is frequently used. Among these, a carbon fiber woven fabric formed from carbon fibers having a high specific elastic modulus and a high specific strength is usually woven by a common shuttle loom or rapier loom, and it is frequently used as a substrate for reinforcing a composite material such as a carbon fiber reinforced plastic (hereinafter, referred to as "CFRP") by forming it as a desired shape by combining with a synthetic resin.

Although a composite material using such a reinforcing substrate, for example, a CFRP, has been used for, for example, structural materials of aircrafts utilizing the excellent properties, in order to further enlarge the application of CFRP, not only molding therefor but also cost down of the reinforcing substrate of carbon fiber yarn or carbon fiber woven fabric are important subjects.

With carbon fiber yarn, usually, as the size (denier) becomes larger, the productivity of the precursor and in the oxidation process and the carbonization process increases and the yarn can be produced at a lower cost.

However, since a usual reinforcing woven fabric is formed using a reinforcing filamentary yarn prepared by binding reinforcing fibers in a form of a nearly circular cross section, in a formation of the woven fabric, the cross section of the reinforcing filamentary yarn indicates an oval shape at an intersection of warp and weft and a weaving thread is greatly crimped. In particular, in a case of a reinforcing woven fabric using a thick reinforcing filamentary yarn, this tendency becomes remarkable because a thick warp and a thick weft intersect with each other.

In such a reinforcing woven fabric wherein reinforcing filamentary yarns are greatly crimped, the fiber density is not uniform and the woven fabric cannot indicate a high strength sufficiently. Further, in a reinforcing-woven fabric using a thick reinforcing filamentary yarn, because usually the weight and the thickness of the woven fabric increase, resin impregnation property when a prepreg or an FRP is formed deteriorates.

Therefore, in an FRP or CFRP prepared using a reinforcing woven fabric woven with thick reinforcing filamentary yarns, there exist many voids in a resin, and a high strength cannot be expected.

On the other hand, if the weight of a woven fabric is reduced using thick reinforcing filamentary yarns, gaps formed between reinforcing filamentary yarns become great. When an FRP or CFRP is molded using such a reinforcing woven fabric having a small weight of woven fabric, the volume content of reinforcing fibers becomes low, voids of a resin are generated concentratively in gaps formed between reinforcing filamentary yarns, and a composite material having a high performance cannot be obtained.

For improving such a defect, JP-A-SHO 58-191244 discloses a thin woven fabric having a thickness of not more than 0.09 mm and a weight of not more than 85 g/m$^2$ which is woven using a thin and flat carbon fiber filamentary yarn having a large width and a method for manufacturing it. This thin woven fabric has small crimp of weaving threads because of its very small thickness, it indicates a high effect for reinforcement, and it is an excellent substrate for molding a thin CFRP.

In a method for weaving such a reinforcing woven fabric using a flat carbon fiber filamentary yarn, warps are supplied from a yarn beam on which a required number of carbon fiber filamentary yarns are wound, or warps are supplied from bobbins of carbon fiber filamentary yarns attached to creels while arranged in a form of a sheet, the warps are opened by a heald by turns and a weft is intermittently inserted into the opening by a shuttle or a rapier to form a woven fabric. As to the method for supplying warps, although there are a method for supplying them from a beam and a method for supplying them directly from bobbins as described above, in any method, the following two methods can be applied. One is a method for unwinding a warp by taking off the warp from a bobbin in a direction perpendicular to a rotational axis of the bobbin while rotating the bobbin slowly (unwinding in a radially outer direction), and the other is a method for unwinding a warp by taking off the warp from a bobbin in an axial direction of the bobbin (unwinding in an axially outer direction).

In the unwinding in an axially outer direction, because a warp is taken off in an axial direction of a bobbin, there is an advantage capable of taking off the warp instantaneously at a high speed and without resistance, as compared with the unwinding in a radially outer direction. In the unwinding in an axially outer direction, however, one twist is added to a warp at every time of taking off of one roll of the warp from a bobbin. Therefore, there is a problem that a reinforcing woven fabric having a uniform width of warps cannot be obtained, because the warp is partially converged by a condition where the flat state is broken at the twisted portion.

Accordingly, a weaving method for employing the unwinding in a radially outer direction so that warps are not twisted is considered. However, in a conventional heald, each mail is formed as a vertically lengthwise shape in order to suppress the interference with warps. Therefore, there is a problem that the flat condition of each warp is broken by a mail and a comb setting a warp density and a woven fabric having a yarn width uniformly enlarged cannot be obtained.

On the other hand, with respect to weft, it is required to be quickly supplied into the opening and it is necessary to further increase the supply speed as compared with that of warps. Therefore, although the method for unwinding a weft from a bobbin in an axially outer direction is frequently employed in order to quickly unwind the weft from the bobbin, there is a problem that a twist is provided.

Accordingly, as a method for unwinding a weft in a radially outer direction such that the flat carbon fiber filamentary yarn is not twisted, JP-A-HEI-2-74645 discloses a method for positively rotating a bobbin wound with a weft by a motor and storing the weft by a length required for its insertion utilizing gravity.

In this method for positively rotating a bobbin, however, there is a problem that the unwinding speed of a weft must be varied depending upon the amount of the weft wound on the bobbin. Further, because the motor is driven intermittently in accordance with insertion of the weft, the motor is frequently stopped and started, and the flat yarn is twisted particularly by loose due to delay of stopping operation.

Further, in order to maintain a fiber density great while suppress crimp of weaving threads at intersections of warps and wefts small, it is preferred to increase the size of the weaving threads as greatly as possible as well as to make the thickness of the weaving threads small, and it is desired that the warps and wefts are woven at respective intervals which are almost the same as the respective yarn widths.

However, if the size of weaving threads becomes great, the yarn width becomes remarkably great, and there occurs a problem that the flat condition of the yarn is broken during weaving and a woven fabric having a uniform fiber density cannot be obtained. Further, if the thickness of weaving threads becomes very small, the stiffness thereof in the width direction becomes small and the flat condition is easily broken at the time of weaving.

In such a case, in order to maintain the flat condition of weaving threads, it is preferred to provide a sizing agent to the the weaving threads. However, if provided too much, impregnation of a resin is obstructed at the time of forming a CFRP, the CFRP to be formed cannot indicate a high strength.

Thus, in the conventional technologies, when the size of reinforcing filamentary yarns is great, it is difficult to form an FRP or CFRP having a high strength, and even if a flat reinforcing filamentary yarn is used, it is difficult to obtain a reinforcing woven fabric having a sufficiently high fiber density, and therefore, such a excellent reinforcing woven fabric has been desired to be provided. Further, in the conventional technologies, there are no method and apparatus for weaving a desired reinforcing woven fabric from a flat reinforcing filamentary yarn, and therefore those have been desired to be provided.

Further, there are the following problems with respect to a preform formed by stacking a plurality of reinforcing woven fabrics.

Namely, since a woven fabric used as a reinforcing substrate for a fiber reinforced plastic is restricted in thickness, a reinforcing substrate having a thickness greater than a certain value must be prepared by stacking a plurality of woven fabrics. Although the reinforcing fibers can be oriented in a direction along the surface of each woven fabric, the reinforcing fibers cannot be oriented in the thickness direction, and there is a problem that the strength between layers is small.

For such a problem, recently three-dimensional woven fabrics are actively developed, but they are still in a condition difficult to apply in practical uses.

Further, for the purpose of increasing a strength between layers, JP-B-HEI-5-49023 proposes a method for reinforcing a substrate of woven fabrics by stitching.

However, since a usual reinforcing woven fabric is woven at a condition of a high-density weave texture for the purpose of obtaining a good handling ability and obtaining an FRP with a high fiber content, the weaving threads intersect to each other while having crimps, they are in a condition capable of not easily moving, and the cross sections of the respective threads are converged in a form of an oval by intersection thereof, as aforementioned. Further, because the surface of the woven fabric has concavities/convexities caused by crimps of weaving threads and concave portions and convex portions are overlapped to each other when such woven fabrics are stacked, the weaving threads are in a condition where they cannot move at all.

When a needle of a stitching machine or a sewing machine is pierced into such a reinforcing woven fabric, because the fibers forming the weaving thread is hard to move and the fibers are strongly gathered, the fibers are easily cut. Further, in a case where the reinforcing filamentary yarn is twisted, entanglement is provided to respective fibers or a sizing agent is applied, fibers are cut more easily.

With respect to damage to fibers, particularly in a case where stitching is performed simultaneously using many needles, because portions being cut concentrate at a same position in the stitching direction, weak portions concentrate when formed as a fiber reinforced plastic, and therefore, the material obtained becomes low in strength. Further, although a method for stitching in advance for the purpose of retionalization of stacking in a molding process is frequently employed, there is still a problem similar to the above-described problem.

DISCLOSURE OF THE INVENTION

An object of the present invention is to provide a reinforcing woven fabric inexpensive and capable of indicating a high strength as a substrate for reinforcing a composite material.

Another object of the present invention is to provide method and apparatus for manufacturing a reinforcing woven fabric capable of weaving the reinforcing woven fabric without twisting reinforcing filamentary yarns and keeping the yarns in a flat condition even if the yarns are flat reinforcing filamentary yarns having a large size.

A further object of the present invention is to provide a preform with no damage to fibers as a substrate for reinforcement using the above-described reinforcing woven fabric.

A still further object of the present invention is to provide a prepreg suitable for forming a composite material low in cost and having a high strength using the above-described reinforcing woven fabric.

A still further object of the present invention is to provide a composite material low in cost and having a high strength using the above-described reinforcing woven fabric.

To accomplish the above objects, a reinforcing woven fabric according to the present invention uses as weaving threads flat and substantially nontwisted multifilaments of reinforcing fiber having less than 0.5 wt. % of sizing agent provided thereto and a binding property of 400–800 mm in hook drop value.

In the present invention, the hook drop value means a factor indicating a degree of a binding property of a multifilament of reinforcing fiber, and it is indicated by a distance of the free fall drop of a metal hook measured by a measuring apparatus shown in FIGS. 1 (a) to (c).

Namely, in the measurement of the hook drop value of a multifilament of reinforcing fiber wound on a bobbin, the multifilament of reinforcing fiber 101 is sampled from the bobbin by a length of 1,000 mm by unwinding in a radially outer direction while the bobbin is rotated, such that the multifilament is not twisted by the unwinding, and the upper end thereof is fixed to the apparatus by an upper cramp 104. The multifilament is fixed by a lower cramp 105 in a vertical direction under a condition where a load of 50 mg/denier is applied to the lower end so that the multifilament is not twisted, the flat condition is not broken and the interval of both cramps is 950 mm.

Then, a metal hook 102 of a weight member, in which a weight 103 is attached to the the metal hook 102 (diameter of wire: 1 mm, radius: 5 mm) via a cotton yarn 106 (distance from the upper end of the hook 102 to the upper end of the weight 103: 30 mm), is hung at a central portion in the width direction of the multifilament of reinforcing fiber 101 fixed at the upper and lower ends thereof so that the distance from the lower end of the upper cramp to the upper end of the metal hook 102 is 50 mm, and when released from a hand, a distance of the free fall drop of the metal hook 102 (a distance from the above-described 50 mm position to the upper end of the metal hook 102 at the dropped position) is measured. The weights of metal hook 102 and cotton yarn 106 are set as light as possible, and the sum of the weights of the metal hook 102, the cotton yarn 106 and the weight 103, that is, the weight of the weight member, is set to 15 g. Ten bobbins are selected randomly from bobbins to be used, the measurement is repeated ten times with respect each selected bobbin, and an average value of n=100 is defined as the hook drop value. Although there is a case where the metal hook 102 drops down to a position of the lower cramp 105, the free-fall drop distance in such a case is defined as 900 mm, and the average value is calculated using the defined value. For this measurement, it is required that the cotton yarn 106 and the weight 103 do not engage the lower cramp 105 even if the metal hook 102 comes into contact with the cramp, and as a drop condition in such a case is shown in FIG. 1 (c), it is necessary to define a sufficiently large space below the lower cramp 105. The measurement is performed under a condition of a temperature of 25° C. and a relative humidity of 60% after the multifilament of reinforcing fiber sampled from a bobbin is left in an environment of a temperature of 25° C. and a relative humidity of 60% for 24 hours.

In the measurement of the hook drop value of a multifilament of reinforcing fiber of a woven fabric (warp or weft), three woven fabrics having a width of 1,000 mm and a length of 1,000 mm are selected, a multifilament of reinforcing fiber is sampled from each woven fabric by a length of 1,000 mm by releasing a warp or a weft so that fluffs are not generated and the released multifilament is not twisted, and the hook drop value is measured by the above-described method. In this case, however, measurement is performed ten times as to each woven fabric, and the hook drop value is defined as an average value of n=30.

As the hook drop value becomes greater, a multifilament of reinforcing fiber is opened and widened more easily. However, if it is too great, formation-maintaining property required for a multifilament becomes poor and weaving to a woven fabric becomes difficult. Therefore, the value has a limit in a greater range. By controlling the binding property in the above-described range in hook drop value, in a formation of a woven fabric, an optimum flat condition of the weaving threads can be obtained and the flat condition can be maintained.

Namely, the binding property of a flat multifilament of reinforcing fiber in the present invention is controlled in the range of 400-800 mm in hook drop value. For example, in a case of a reinforcing woven fabric using a carbon fiber filamentary yarn, in order to prevent a process trouble due to winding of a cut filament onto a roller in a manufacturing process of carbon fibers, a carbon fiber filamentary yarn is provided with a binding property by blowing air to a fiber bundle of a precursor to entangle filaments of the yarn. Further, a binding property is provided to a carbon fiber filamentary yarn by applying a sizing agent, thereby bonding the filaments. Although a degree of the binding property is decided by the degree of the entanglement of filaments, the amount of the sizing agent provided or the degree of bonding of filaments due to the sizing agent, if the hook drop value is less than 400 mm and the degree of the binding property is too great, the binding property of carbon fibers becomes too great, and even if weaving threads of a woven fabric are further opened and widened on a weaving machine to process a woven fabric having a great covering factor, the effect due to the processing is hardly obtained. Moreover, at the time of hand lay up molding or processing to a prepreg, the widths of warps and wefts of a woven fabric are hardly enlarged and voids of a resin tend to be generated concentratively in gaps formed between carbon fiber filamentary yarns. Further, impregnation property of a resin when processed to a prepreg deteriorates, and an FRP with a high performance cannot be obtained. If the hook drop value is more than 800 mm, the binding property of a carbon fiber filamentary yarn becomes poor, fluffs are generated during weaving, and not only the working environment deteriorates but also the strength of an FRP to be obtained decreases.

Where, the amount of a provided sizing agent affecting the hook drop value is controlled to be less than 0.5 wt. %, and a preferable amount is in the range of not less than 0.1 wt. % and less than 0.5 wt. %. If the amount of a provided sizing agent is less than 0.1 wt. %, not only the flat condition cannot be maintained but also the binding property of the fibers is low and fluffs are likely to be generated, and therefore the weaving property is likely to deteriorate. On the other hand, if the amount is 0.5 wt. % or more, although the flat condition can be well maintained, the opening property of the fibers decreases, and it is difficult to prepare a woven fabric having a great covering factor. The hook drop value of a multifilament of reinforcing fiber of the reinforcing woven fabric according to the present invention means a hook drop value of a thread released from the woven fabric, and the hook drop value of a multifilament of reinforcing fiber in the manufacturing method and apparatus according to the present invention means a hook drop value of a yarn to be used.

It is necessary that the above-described weaving thread of a multifilament of reinforcing fiber is substantially non-twisted.

Where, the "substantially nontwisted"0 means a condition where there is not a twist of not less than one turn per a yarn length of 1 m. Namely, it means a condition of no twist in practice.

If the weaving thread is twisted, the yarn width becomes small and the thickness of the yarn becomes great at the twisted portion, and concavities and convexities are formed on the surface of a fabric woven. In such a woven fabric, a stress concentrates at the twisted portion when an external force operates, and the strength property becomes nonuniform when formed as, for example, an FRP.

In a reinforcing woven fabric formed from such a weaving thread having an appropriately flat and nontwisted condition, even if the size of the weaving thread is great, and even if the fiber density is great, crimps of the weaving threads at the intersections thereof are suppressed extremely small, and a high strength can be obtained when formed as an FRP or CFRP. Further, because the size of the weaving threads can be increased, the weaving threads, ultimately, a reinforcing woven fabric, can be produced more inexpensively.

Further, because the crimp can be suppressed extremely small, the unit weight of a woven fabric can be set great, and the covering factor can be controlled to be near 100% while maintaining the flat condition of the weaving threads. Therefore, in an FRP and others, the fiber content can be controlled to be high as well as resin-rich portions between weaving threads can be suppressed extremely small, and a composite having a high strength and a uniform strength property can be obtained.

Furthermore, because each weaving thread is maintained at a flat condition in the formation of a woven fabric, the property of resin impregnation is extremely good. Therefore, a composite having a further uniform properties can be obtained, and an aimed strength property can be easily obtained.

In such a reinforcing woven fabric according to the present invention, it is preferred that the thickness of the above-described multifilament of reinforcing fiber is in the range of 0.05–0.2 mm and the ratio of width/thickness thereof is in the range of 30–250, preferably more than 150 and not more than 250. If the thickness of the multifilament is less than the above-described range, it is too thin and it is difficult to maintain the flat formation, and if over the above-described range, it is difficult to suppress the crimp small. If the ratio of width/thickness of the multifilament is less than 30, it is difficult to suppress the crimp small. On the other hand, if over 250, the flat condition is likely to be broken during weaving. Further, as the yarn width, a range of about 4–16 mm is suitable for easy weaving.

The reinforcing woven fabric according to the present invention can be woven as various formations. Preferred thicknesses and weights of the woven fabrics of respective formations are in the following ranges.

In a case of a woven fabric using the aforementioned flat multifilament of reinforcing fiber as its warps and wefts, it is preferred that the thickness of the woven fabric is in the range of 0.1–0.4 mm, preferably in the range of 0.1–0.2 mm, and the weight of the woven fabric is in the range of 100–300 g/m$^2$, preferably in the range of 100–200 g/m$^2$ (woven fabric-1).

In a case of a unidirectional woven fabric using the aforementioned flat multifilament of reinforcing fiber as its warps or wefts and woven by using auxiliary yarns, it is preferred that the thickness of the woven fabric is in the range 0.07–0.3 mm, and the weight of the woven fabric is in the range of 100–320 g/m$^2$ (woven fabric-2).

In the above-described woven fabric or unidirectional woven fabric, in a case where the multifilament of reinforcing fiber is a carbon fiber filamentary yarn, it is preferred that the number of filaments of the carbon fiber filamentary yarn is in the range of 5,000–24,000, and the size thereof is in the range of 3,000–20,000 deniers.

As the auxiliary yarn in above-described woven fabric-2, preferably a flat weaving thread of thin fibers having a size of not more than 2,000 deniers is used, more preferably in the range of 50–600 deniers. If the size is great, the crimp of the auxiliary yarn becomes great, and if the size is small, it is likely to be cut at the time of weaving or handling. This auxiliary yarn is used for the purpose of holding the parallel-arranged flat weaving threads integrally, and inorganic fibers such as carbon fibers and glass fibers and organic fibers such as polyaramide fibers, vinylon fibers and polyester fibers can be used for the auxiliary yarn, and the kind thereof is not particularly restricted.

In a case of a woven fabric using the flat multifilament of reinforcing fiber as at least one of its warps and wefts and wherein at least one of the warp and weft is formed as a laminate of a plurality of the multifilaments of reinforcing fiber, it is preferred that the thickness of the woven fabric is in the range of 0.1–0.6 mm, and the weight of the woven fabric is in the range of 200–500 g/m$^2$ (woven fabric-3). Because a flat thread is used, even if a plurality of the threads are laminated in such a condition, the crimp is suppressed small. The fiber density of the woven fabric can be increased by the lamination.

Where, the fiber density of the woven fabric is defined by the following equation.

Fiber density of woven fabric (g/m$^3$)=[Weight of woven fabric (g/m$^2$)]/[Thickness of woven fabric (mm)]

The weight of woven fabric (g/m$^2$) and the thickness of woven fabric (mm) were measured based on JIS-R7602, respectively.

Namely, in the measurement of the weight of woven fabric, a portion including an edge portion was removed from each end of a woven fabric by a width of 30 mm, five square test pieces each having a side length of 100 mm±0.5 mm were sampled continuously in the width direction of the woven fabric, and the weight thereof was measured. Then, the weight per unit area was calculated by the following equation.

$$\rho_A = m/A \times 10^6$$

Where, $\rho_A$: weight (g/m$^2$)

m: weight of test piece (g)

A: area of test piece (mm$^2$)

In the measurement of the thickness of woven fabric, a load variation type thickness meter was used, a thickness indicated when a pressure of an area of a pressing plate of 1 cm$^2$ and a load of 50 kPa (510 gf/cm$^2$) was applied for 20 seconds was measured with the same five test pieces as those used in the measurement of the the weight of woven fabric.

Further, the thickness of yarn was measured in a manner similar to the above-described measurement of the thickness of woven fabric.

In the above-described woven fabric, in a case where the multifilament of reinforcing fiber is a carbon fiber filamentary yarn, it is preferred that the number of filaments of the carbon fiber filamentary yarn is in the range of 3,000–24,000, and the size thereof is in the range of 1,500–20,000 deniers.

As described above, even if a thick yarn having a size of 3,000–20,000 deniers or 1,500–20,000 deniers is used, by controlling in the above-described optimum range of weight of woven fabric, it can be prevented that the flat condition of the flat yarn is broken, the weave texture becomes too rough, or the property of resin impregnation deteriorates.

In a case where the reinforcing filamentary yarn is a carbon fiber filamentary yarn, it is required that the flat carbon fiber filamentary yarn used has a great tensile elongation at break and a high tensile strength at break, and a tensile elongation at break of not less than 1.5%, a tensile strength at break of not less than 200 kg·f/mm$^2$ and a tensile elastic modulus of not less than 20,000 kg·f/mm$^2$ are preferred.

The above-described woven fabrics of various formations according to the present invention are woven in a form of, for example, a plain weave. Further, because a flat weaving thread having a great hook drop value is used and the crimp is suppressed extremely small, a great covering factor can be achieved.

For example, in a case where the aforementioned woven fabric-1 is used and the flat multifilament of reinforcing fiber is a carbon fiber filamentary yarn, it is preferred that the weight of the woven fabric and the size of the carbon fiber filamentary yarn satisfy the following equation, and the covering factor of the woven fabric is in the range of 95–100%, preferably in the range of 98–100%.

$$W = k \cdot D^{1/2}$$

Where,

W: weight of woven fabric (g/m²)

k: proportional constant (1.4–3.6)

D: size of carbon fiber filamentary yarn (denier).

Further, in a case where the aforementioned woven fabric-2 is used and the flat multifilament of reinforcing fiber is a carbon fiber filamentary yarn, it is preferred that the weight of the woven fabric and the size of the carbon fiber filamentary yarn satisfy the following equation, and the covering factor of the woven fabric is in the range of 95–100%, preferably in the range of 98–100%.

$$W = k \cdot D^{1/2}$$

Where,

W: weight of woven fabric (g/m²)

k: proportional constant (0.9–4.0)

D: size of carbon fiber filamentary yarn (denier).

Furthermore, in a case where the aforementioned woven fabric-3 is used and the flat multifilament of reinforcing fiber is a carbon fiber filamentary yarn, it is preferred that the weight of the woven fabric and the size of the carbon fiber filamentary yarn satisfy the following equation, and the covering factor of the woven fabric is in the range of 95–100%, preferably in the range of 98–100%.

$$W = k \cdot D^{1/2}$$

Where,

W: weight of woven fabric (g/m²)

k: proportional constant (2.0–6.0)

D: size of carbon fiber filamentary yarn (denier).

In the above-described woven fabrics of the respective formations, if the covering factor is less than 95%, a gap between carbon fiber filamentary yarns in which fibers do not exist becomes great, and when formed as a prepreg or a CFRP, not only the gap portion becomes a resin-rich portion but also the resin is charged into this portion in a concentrated condition and voids concentrate therein. When a stress is applied to such a prepreg or CFRP, a fracture propagates from the resin-rich portion or the portion concentrated with voids, and such a condition is not preferred.

Where, the covering factor Cf is a factor relating to a size of a gap formed between threads, and when a region having an area of $S_1$ is set on a woven fabric and the area of the gap formed between threads in the region with an area of $S_1$ is referred to as $S_2$, the covering factor is defined by the following equation.

$$Covering\ factor\ Cf = [(S_1 - S_2)/S_1] \times 100$$

In the woven fabric according to the present invention, warps or wefts comprising a thin and flat multifilament of reinforcing fiber are used. Therefore, the woven fabric is in a condition of a small skipped pick, that is, a great covering factor. When a prepreg or an FRP is formed using such a reinforcing woven fabric having a great covering factor, a uniform formed body can be obtained, and voids are not generated in a resin and nonuniformity of distribution of fibers causing a stress concentration does not occur.

As a method for making the above-described flat yarn it self, for example, in a process for manufacturing a reinforcing filamentary yarn, a plurality of bundles of reinforcing fibers are widened to a predetermined width by a roller, etc., and they are kept in a flat condition as they are, or the formation thereof may be maintained by a sizing agent, etc., so that they are not returned into an original condition. Particularly, in order to maintain the flat condition appropriately, it is preferred that a small amount of sizing agent of less than 0.5 wt. % is provided to the flat yarn.

In the reinforcing filamentary yarn forming the woven fabric according to the present invention, because the hook drop value is great to be 400–800 mm, the amount of provided sizing agent is small to be less than 0.5 wt. % and the ratio of width/thickness of the weaving thread is great to be 30–250, there is a case where the formation becomes unstable, for example, the yarn width varies or the weaving threads shift depending on handling.

With such a problem, the handling property can be greatly improved by bonding specified portions of the woven fabric, that is, bonding warps and wefts to each other at positions of their intersections. Of course, the woven fabric is not always restricted to such a bonded woven fabric, and a usual woven fabric with nonbonding is included.

As the method for bonding a woven fabric, a method for arranging a polymer yarn having a low melting point along a weaving thread of a flat reinforcing filamentary yarn, and after weaving, melting the polymer yarn by a heater, thereby bonding the intersection of weaving threads by the polymer, is simple and preferred. In order to bond further surely, a method for disposing the low-melting point polymer yarn at a central portion of the flat reinforcing filamentary yarn in the width direction of the reinforcing filamentary yarn and bonding using it is more preferred.

To dispose the low-melting point polymer yarn at a central portion of the flat reinforcing filamentary yarn in the width direction of the reinforcing filamentary yarn, in a case of warp, can be achieved by providing an additional mail to a mail of a heald having a long rectangular shape which is used in the manufacturing process of the woven fabric according to the present invention, at an upper or lower position of the mail and at a central position of the mail in the width direction of the mail, and passing the low-melting point polymer yarn through the additional mail.

On the other hand, in a case of weft, the low-melting point polymer yarn may be supplied from a guide provided at a position before or after a weft tension providing means (a plate spring tension providing device) used in the manufacturing process of the woven fabric according to the present invention, at a position above a flat reinforcing filamentary yarn supplied as a weft and at a central position of the yarn in the width direction of the yarn.

Although the variation of width of both warps and wefts can be suppressed more appropriately if the low-melting point polymer yarns are arranged along both the warps and wefts and whereby they are bonded, the polymer yarn may be disposed relative to one of warps and wefts in accordance with the purpose of use.

Particularly, in a case where the woven fabric according to the present invention is processed into a wet prepreg, if the low-melting point polymer yarns are arranged along warps and bonding is performed thereby, the variation of the width of wefts caused by the self-weight of a resin can be suppressed.

As such a low-melting point polymer yarn for bonding, a yarn of a thermoplastic polymer having a low melting point such as a copolymerized nylon or a polyester having a relatively low melting point can be used.

The above-described reinforcing woven fabric according to the present invention is served to forming of a preform or a prepreg, or an FRP or a CFRP, and it indicates excellent properties as a reinforcing substrate.

The preform according to the present invention is formed by stacking a plurality of the above-described reinforcing woven fabrics and stitching them integrally using a stitch yarn, or by stacking at least one of the above-described reinforcing woven fabrics and another reinforcing woven fabric and stitching them integrally using a stitch yarn. In this reinforcing woven fabric, since a flat and substantially nontwisted multifilament of reinforcing fiber is used as a weaving thread and the binding property thereof is low (the hook drop value is great), the woven fabric can be easily opened and widened, and even if a needle is pierced, the respective single fibers can escape easily.

When the weaving thread is slightly twisted, in the twisted portion, fibers crossing in width direction of the thread are present in the thread and such fibers bind the thread strongly.

Therefore, if a needle of a stitching machine or a sewing machine is pierced into such a portion, because the respective single fibers can hardly escape, the single fibers are likely to be cut by a resistance with the needle.

In the present invention, because a flat yarn in which the width is great relative to the thickness is used, the arrangement pitch of the weaving threads inevitably becomes great and the thickness of the woven fabric becomes small. Therefore, because the force of constraint at intersections of warps and wefts is small, when a needle having a sharp tip is pierced, the reinforcing filamentary yarn can easily move and escape, and because the reinforcing filamentary yarn is nontwisted and flat and the hook drop value thereof is high, the fibers themselves also can easily move and damage to the fibers does not occur. Further, even if the arrangement pitch of the weaving threads is set great, because the thread is flat and the width thereof is great and the crimp can be suppressed extremely small as aforementioned, a high covering factor of 95–100% can be achieved.

By such a high covering factor, a composite material having a high fiber content can be obtained, occurrence of resin-rich portions can be prevented, and a composite having high strength and high elastic modulus can be obtained. Further, because there is no damage to fibers even if stitched, a uniform and high strength property can be ensured.

In a usual substrate of reinforcing woven fabric, even in a case where only one woven fabric is used, it is difficult to avoid damage to the fibers of the substrate when it is stitched, and in a case where a substrate is formed as a laminate, the surface of the substrate is given with concavities and convexities formed at intervals of weaving threads. If a plurality of such woven fabrics are stacked, the concavities and convexities are overlapped to each other at the contact surfaces of the woven fabric substrates and the threads almost cannot move at all. Therefore, when a needle is pierced, a high resistance is generated, and whereby the needle itself may be broken, damage to fibers of the substrate and cutting of a stitch yarn frequently occur, and therefore, a laminate having a relatively great thickness cannot be stitched.

In the preform according to the present invention, however, because there are not such problems, the number of the lamination of the reinforcing woven fabrics can be increased. As the upper limit of the thickness of the laminate, up to about 10 mm, stitching is possible without damage to needle and fibers of the substrate.

The lamination structure of the reinforcing woven fabrics can be freely selected. For example, the weaving threads of the respective reinforcing woven fabrics may be arranged in a same direction to form a unidirectional lamination structure, or a structure including reinforcing woven fabric layers with arrangement directions of weaving threads of 0°/90° and reinforcing woven fabric layers with arrangement directions of weaving threads of ±45° may be constituted. Further, if the laminated reinforcing woven fabrics form a quasi-isotropic lamination structure, a further uniform property can be obtained when formed as a composite material. In such a quasi-isotropic lamination structure, a mirror-symmetry lamination relative to a center in the thickness direction is preferred. In such a condition, a bow is not generated when a cured plate of fiber reinforced plastic is formed.

Particularly, because a CFRP whose reinforcing fiber is a carbon fiber is a material having a high anisotropic property, it has a high strength in an axial direction of fiber but the strength and the elastic modulus rapidly decrease in a direction out of the axial direction of fiber. Therefore, when woven fabrics whose fiber directions are 0° and 90° and bias cut woven fabrics whose fiber directions are +45° and −45° are stacked alternately using the carbon fiber woven fabrics, because the properties in the directions of fiber axes of 0°, 90°, +45° and −45° are the same, the FRP has the same strength and elastic modulus in all directions, and in particular, it is suitable as a structural material for an aircraft.

The stitching method of a stitch yarn is not particularly restricted, and for example, chain stitch can be employed.

Further, as the stitch yarn, a yarn such as a carbon fiber yarn, a glass fiber yarn or a polyaramide fiber yarn can be used, and among these yarns, a yarn having a high tensile elongation at break is preferred. Particularly, it is preferred that the tensile elongation at break of a stitch yarn is greater than the tensile elongation at break of a multifilament of reinforcing fiber used for the reinforcing woven fabric. When such a stitch yarn having a great tensile elongation at break is used, even if a tensile stress operates on a fiber reinforced resin material, the weaving thread of multifilament of reinforcing fiber takes charge of the stress prior to the stitch yarn, and therefore, nondesired conditions can be avoided where the stitch yarn is cut or a stress concentration of the weaving thread due to fastening by the stitch yarn is generated.

The size of a stitch yarn is preferably in the range of 200–2,000 deniers although it depends upon the purpose of stitching, and it is preferred that such a stitch yarn is stitched by repeatedly piercing it at a pitch of 5–20 mm. Particularly, in a case where a portion between layers is required to be strengthened, a great size of 1,000–2,000 deniers is preferred, and in a case where a lamination process in molding is required to be simplified, the size of a stitch yarn may be small in the range of 200–600 deniers.

When the stitching is performed simultaneously using a plurality of needles, the interval of the needles is preferably in the range of about 2–50 mm. Further, the stitching may be performed by a single needle in a condition of linear sewing or curved sewing. As the sewing method, any of chain stitching as aforementioned and lock stitching may be employed. At that time, the needle preferably has a sharp and thin tip to suppress damage to fibers smaller.

As described above, although the preform according to the present invention is not damaged by a needle and it is an excellent substrate, because single fibers easily moves if the tension of a stitch yarn is high when stitched, the orientation of reinforcing fibers may be disturbed at a pierced portion by the tension. For such a problem, in the lamination of reinforcing substrates, the above-described disturbance of fiber orientation can be prevented by disposing a glass cloth whose texture is hardly deformed or a thin surface mat of glass fiber, or a reinforcing woven fabric substrate according to the present invention in which the warps and the wefts are bonded at their intersections by an adhesive (for example, a low-melting point polymer as aforementioned) as an outermost layer.

The prepreg according to the present invention is prepared by impregnating a matrix resin into the aforementioned reinforcing woven fabric according to the present invention by an amount of 30–70 wt. %, preferably 35–50 wt. %, more preferably 35 45 wt. %.

As the matrix resin, a thermosetting resin such as an epoxy resin, an unsaturated polyester resin, a polyimide resin and a phenolic resin can be used. These thermosetting resins are in a condition of B-stage in a state impregnated into a woven fabric.

Further, as the matrix resin, a thermoplastic resin such as a nylon resin, a polyester resin, a polybutylene terephthalate resin, a polyetereterketone (PEEK) resin and a bismaleimide resin also can be used.

In order to prevent generation of microcracks in a fiber reinforced composite material formed using such a prepreg, it is effective to controlling the tensile elongation at break of the matrix resin in a cured or solidified condition greater than the tensile elongation at break of the multifilament of reinforcing fiber used for the reinforcing woven fabric. For example, it is preferred that the matrix resin is a thermosetting resin having a tensile elongation at break in a cured condition of 1.5–10%, more preferably 3.5–10%, or a thermoplastic resin having a tensile elongation at break in a solidified condition of 8–200%.

Further, the FRP according to the present invention comprises a reinforcing woven fabric described as aforementioned and a matrix resin of 30–70 wt. %, preferably 35–50 wt. %. As the matrix resin, a thermosetting resin or a thermoplastic resin similar to that above-described can be used.

Further, it is preferred that the tensile elongation at break of the matrix resin is greater than the tensile elongation at break of the multifilament of reinforcing fiber used for the reinforcing woven fabric, and use of a thermosetting resin having a tensile elongation at break of 1.5–10%, more preferably 3.5–10%, or a thermoplastic resin having a tensile elongation at break of 8–200%, is preferred.

An FRP using the prepreg can be formed by a known method. It can be formed by stacking a predetermined number of prepregs in a predetermined direction, in a case where the matrix resin is a thermosetting resin, curing the resin under a compressed condition of 4–10 kg/cm$^2$ while heating at 100°–200° C., and in a case where the matrix resin is a thermoplastic resin, heating the resin at a temperature higher than a melting point of the resin under a compressed condition of 7–30 kg/cm$^2$, melting the resin and cooling the resin.

In the reinforcing woven fabric according to the present invention, because a flat multifilament of reinforcing fiber whose hook drop value is high and which is easily opened and widened is used as the weaving thread, in a process for forming an FRP, when a reinforcing substrate such as a woven fabric itself, a prepreg or a preform is set along a mold, the intersecting angle of weaving threads easily varies while the respective weaving threads are maintained in a flat condition and a condition of high fiber density, and the substrate is excellent in draping property. Therefore, the reinforcing substrate including this reinforcing woven fabric can be easily formed in a predetermined shape by, for example, deep drawing without causing enlargement of gaps between threads.

The aforementioned reinforcing woven fabric according to the present invention can be manufactured by the following methods Namely, the method for manufacturing a reinforcing woven fabric according to the present invention by supplying wefts between a plurality of arranged warps comprises a warp supplying step for using flat and substantially nontwisted multifilaments of reinforcing fiber as at least the warps, keeping the plurality of warps in a condition where the width direction of each warp is substantially in a vertical direction as well as arranging the warps at a predetermined density in the warp arrangement direction, thereafter, converting the width direction of each warp so as to be substantially in a horizontal direction, opening and widening each of the warps on a warp guiding means and introducing the warps into a shed forming means (manufacturing method-1).

In this manufacturing method-1, the warps are opened and widened, for example, by oscillation of the warp guiding means.

Further, in the manufacturing method according to the present invention, opening of weaving threads may be added even after weaving the woven fabric.

Namely, the method for manufacturing a reinforcing woven fabric according to the present invention comprises the steps of weaving a woven fabric using flat and substantially nontwisted multifilaments of reinforcing fiber as at least one of warps and wefts; and thereafter opening and widening the warps and/or wefts of the woven fabric on a woven fabric guiding means (manufacturing method-2).

Furthermore, the method for manufacturing a reinforcing woven fabric according to the present invention comprises the steps of (a) a warp supplying step for using flat and substantially nontwisted multifilaments of reinforcing fiber as the warps, keeping the plurality of warps in a condition where the width direction of each warp is substantially in a vertical direction as well as arranging the warps at a predetermined density in the warp arrangement direction, thereafter, converting the width direction of each warp so as to be substantially in a horizontal direction and introducing the warps into a shed forming means; (b) a weft supplying step for using flat and substantially nontwisted multifilaments of reinforcing fiber as the weft, unwinding the weft from a bobbin in a radially outer direction, positioning the weft by a guide means so that the width direction of the weft is substantially in a horizontal direction at a weft supplying position, and while storing the weft between a position of the weft unwinding and a position of the guide means by a length required for one weft supply motion relative to the warps, supplying the weft between the warps through the guide means at a tense condition; and (c) a step for opening and widening the warps and the wefts on a woven fabric guiding means after weaving the warps and the supplied weft as a reinforcing woven fabric (manufacturing method-3).

In the above-described manufacturing method-2 and the manufacturing method-3, the warps and/or wefts are opened and widened, for example, by oscillation of said woven fabric guiding means. Or, the warps and/or wefts are opened and widened by a fluid injected from a fluid injection means. If the fluid injection means is oscilated in a direction along the surface of the woven fabric, an advantage due to the opening and widening can be further increased. Namely, a woven fabric having a great covering factor can be obtained.

A reinforcing woven fabric in which the binding property of the multifilaments of reinforcing fiber is in the range of 400–800 mm in hook drop value can be obtained by the above-described respective manufacturing methods. In these cases, as aforementioned, it is preferred that the thickness of the multifilament of reinforcing fiber is in the range of 0.05–0.2 mm and the ratio of width/thickness thereof is in the range of 30–250. Further, when the multifilament of reinforcing fiber is a carbon fiber filamentary yarn, it is preferred that less than 0.5 wt. % of sizing agent is provided to the reinforcing woven fabric.

The above-described manufacturing methods can be performed using the following manufacturing apparatuses.

Namely, the apparatus for manufacturing a reinforcing woven fabric according to the present invention has means for supplying warps, the warp supplying means comprises:

a comb having a plurality of wires for combing a plurality of warps of flat and substantially nontwisted multifilaments of reinforcing fiber unwound from bobbins at a predetermined density while keeping the flat condition of each warp as well as keeping the warps in a condition where the width direction of each warp is substantially in a vertical direction;

a guide converting the width direction of each warp sent from the comb so as to be substantially in a horizontal direction;

a warp opening and widening means for opening and widening each warp sent from the guide by oscilating each warp while keeping the condition of the converted width direction of each warp; and a heald providing opening and closing motion to the respective warps sent from the warp opening and widening means (manufacturing apparatus-1).

Further, the apparatus for manufacturing a reinforcing woven fabric according to the present invention comprises means for opening and widening warps and/or wefts of a woven fabric, the woven fabric being woven using flat and substantially nontwisted multifilaments of reinforcing fiber as at least one of the warps and wefts (manufacturing apparatus-2).

Furthermore, the apparatus for manufacturing a reinforcing woven fabric according to the present invention includes:

a) a warp supplying means comprising:

a comb having a plurality of wires for combing a plurality of warps of flat and substantially nontwisted multifilaments of reinforcing fiber unwound from bobbins at a predetermined density while keeping the flat condition of each warp as well as keeping the warps in a condition where the width direction of each warp is substantially in a vertical direction;

a guide converting the width direction of each warp sent from the comb so as to be substantially in a horizontal direction; and a heald providing opening and closing motion to the respective warps sent from the guide while keeping the condition of the converted width direction of each warp;

b) a weft supplying means comprising:

a take-off roller rotating in accordance with operation of a main shaft of a weaving machine for unwinding a weft of a flat and substantially nontwisted multifilament of reinforcing fiber from a bobbin in a radially outer direction at a constant speed;

a guide roller positioning the taken-off weft so that the width direction of the weft is substantially in a horizontal direction at a weft supplying position;

a weft storage means for supplying the weft to the guide roller while storing the weft between the take-off roller and the guide roller by a length required for one weft supply motion relative to the warps; and a tension providing means for keeping the weft sent from the guide roller in a tense condition; and c) means for opening and widening warps and wefts of a woven fabric which is woven using the warps and wefts (manufacturing apparatus-3).

In the above-described respective manufacturing apparatuses, as means for opening and widening warps before weaving, for example, means added with a mechanism for oscilating the above-described guide in the warp arrangement direction can be employed. Further, as opening and widening means after weaving, means for oscilating a woven fabric guiding means in the warp arrangement direction or a fluid injection means for injecting a fluid (for example, air, water or steam) for opening and widening can be employed.

The above-described multifilament of reinforcing fiber is, for example, a carbon fiber filamentary yarn.

In the aforementioned reinforcing woven fabric according to the present invention, because a flat and substantially nontwisted multifilament of reinforcing fiber having a hook drop value in the specified range is used as the weaving thread, even if a weaving thread having a great size is used, a woven fabric which is thin and of which crimp of the weaving thread is very small can be formed, and a reinforcing substrate for a composite material low in cost and capable of indicating a high strength can be obtained.

Further, the preform formed using this reinforcing woven fabric and stitched using a stitch yarn becomes a reinforcing substrate for a composite material in which there is no damage to fibers and which can uniformly indicate a high strength to be aimed.

Further, by using the above-described reinforcing woven fabric, a prepreg low in cost and high in strength and suitable for forming of a composite material, and an excellent fiber reinforced composite material can be obtained.

Furthermore, in the method and apparatus for manufacturing a reinforcing woven fabric according to the present invention, even if a flat reinforcing filamentary yarn having a great size is used, the above-described reinforcing woven fabric to be aimed can be surely woven in a condition where the filamentary yarn is not twisted and maintained in a flat condition.

THE BEST MODE FOR CARRYING OUT THE INVENTION

Figure 1A:
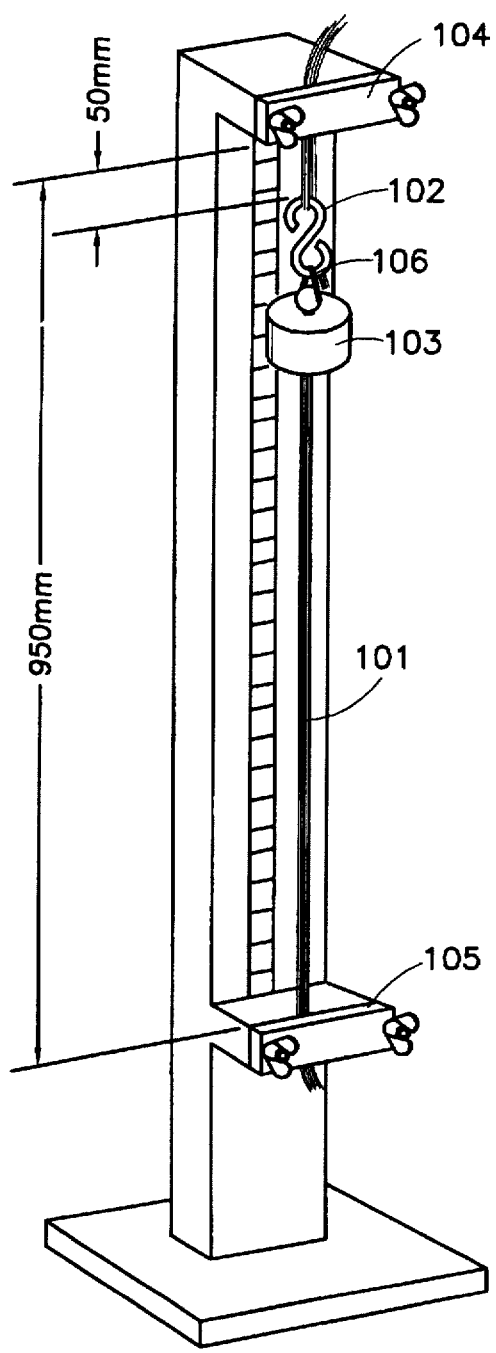
FIG. 1 (a) is a perspective view of a device for measuring a hook drop value, (b) is an enlarged partial elevational view of (a) and (c) is a partial perspective view of (a).

Hereinafter, preferred embodiments of the present invention will be explained with reference to the drawings.

FIGS. 2–6 show an apparatus for manufacturing a reinforcing woven fabric according to an embodiment of the present invention, and they depict an apparatus for weaving a carbon fiber reinforcing woven fabric using weaving threads comprising carbon fiber filamentary yarns. This apparatus has a bobbin 1, a take-off roller 3, a tension providing mechanism 4, guide rollers 5–7, a plate spring tension providing mechanism 8, a pressing plate guide 9 and a rapier 11 as a weft supplying apparatus, and creels 20, a comb 21, a horizontal guide 22, healds 23 and a reed 24 as a warp supplying apparatus.

Firstly, the weft supplying apparatus will be explained. A weft Twf which is a flat carbon fiber multifilament formed from many carbon fibers is wound on bobbin 1, the weft Twf is guided to take-off roller 3 through a tension roller 2, and it is unwound from the bobbin in a radially outer direction at a constant speed by rotation of the take-off roller 3.

Where, tension roller 2 is located at an upper position when the weft Twf is unwound from the bobbin 1, and when the rotation of take-off roller 3 is stopped, it is lowered automatically to a lower position as well as the rotation by inertia of the bobbin 1 is stopped by operation of a brake. Further, take-off roller 3 rotates in accordance with the operation of a main shaft 26 of this weaving machine, and the main shaft 26 is rotated by a driving motor 25. The speed of unwinding of the weft Twf, that is, the surface speed of the take-off roller 3, can be easily decided if the rotational speed (rpm) of the weaving machine and the length of the weft necessary for one rotation are determined.

The carbon fiber multifilament forming the weft Twf or a warp Twr has a number of carbon fiber filaments of 5,000–24,000, is substantially nontwisted, has a hook drop value of 400–800 mm, and it is wound on the bobbin 1 or bobbins 20a and 20b of creels 20 described later each formed as a tubular pipe at a predetermined width of traversing while kept in a flat formation by, for example, a sizing agent in advance.

As the carbon fiber multifilament, a multifilament having a size of 3,000–20,000 deniers, a yarn width of 4–16 mm, a thickness of 0.05–0.2 mm and a ratio of yarn width/yarn thickness of 30–250 is used. Further, in a case where a laminate formed by laminating a plurality of flat unit carbon fiber filamentary yarns is used as the weaving thread of carbon fiber multifilament, a unit carbon fiber filamentary yarn nontwisted and having a hook drop value of 400–800 mm, a number of carbon fiber filaments of 3,000–24,000, a size of 1,500–20,000 deniers, a yarn width of 4–16 mm, a thickness of 0.05–0.2 mm and a ratio of yarn width/yarn thickness of 30–250 is used.

The weft Twf taken off from take-off roller 3 passes through a guide 4a of tension providing mechanism 4 and it is guided by a horizontal guide roller 5, a vertical guide roller 6 and a horizontal guide roller 7 and introduced into plate spring tension providing mechanism 8.

For each of the guide rollers 5–7, it is preferred that the diameter is in the range of about 10–20 mm, the length is in the range of about 100–300 mm and a rotation system enclosing bearings is employed. If the diameter is too small, the carbon fiber multifilament forming the weft Twf is bent and cutting of single fibers is liable to occur, and if the diameter is over 20 mm, the inertia of rotation thereof becomes great and tension variation at starting and stopping becomes great.

Further, as the length of the respective guide rollers 5–7, a length is required wherein the passing weft Twf does not come into contact with a portion supporting any of the guide rollers 5–7 even if the weft moves in left and right-hand directions or in a vertical direction. If the weft Twf comes into contact with a portion supporting any of the guide rollers 5–7, the flat condition thereof is broken.

The horizontal guide rollers 5 and 7 positions the guided weft Twf in a vertical direction, and the vertical guide roller 6 positions the weft Twf in a horizontal direction. Therefore, as the guide rollers, at least a horizontal guide roller and a vertical guide roller may be disposed alternately.

In such a constitution, the flat surface of the weft Twf must be turned at an angle of 90 degrees between the horizontal guide roller 5 and the vertical guide roller 6 and between the vertical guide roller 6 and the horizontal guide roller 7. Therefore, the distances between guide rollers 5 and 6 and between guide rollers 6 and 7 must be set not less than 50 mm although the dimension is different depending upon the width of the weft Twf. If the distance between guide rollers is less than 50 mm, the weft Twf passes the vertical guide roller 6 or the horizontal guide roller 7 in a condition where the weft is twisted, and such a weft is woven. Further, if the weft is turned at an angle of 90 degrees in a short passage, a tension is applied to both width end portions of the weaving thread and fluffs are generated.

Although the respective guide rollers 5–7 may be formed from a single roller, if the respective rollers are formed by a couple of rollers and the weft is passed through the couple of rollers at an S-passage, the tension operated on the weft Twf is stabilized, and the positioning of the weft Twf can be performed more appropriately.

In the tension providing mechanism 4, when the weft Twf is inserted intermittently by a rapier as described later, a looseness of the weft Twf, which is unwound by take-off roller 3 at a constant speed, between the take-off roller 3 and the horizontal guide roller 5 is absorbed by a spring 4b, and the weft Twf is always tensed. If the weft Twf is not tensed by spring 4b, the weft is twisted when it is loosened, and the twisted weft passes through the guide rollers 5–7 and is woven. The guide 4a attached to the lower end of the spring 4b is extended in a horizontal direction so that the flat surface of the carbon fiber filamentary yarn is guided at a horizontal condition.

As other methods for tensing the weft Twf, although there is a method due to air suction, in such a method there is a problem that the weft Twf is twisted during suction. Further, in a method for tensing the weft Twf by a weight, there is a problem that the variation of tension becomes too great and carbon fibers forming the weft are damaged. Therefore, the above-described method by a spring is the most simple and reliable.

Further, at a position downstream of the horizontal guide roller 7 for the weft Twf, a tension providing mechanism 8 for controlling the tension of the weft Twf uniform is disposed. This tension providing mechanism 8 maintains the tension of the weft Twf uniform by nipping the weft Twf with two wide plate springs 8a and 8b.

In the method for supplying the weft Twf in the apparatus for manufacturing a reinforcing woven fabric according to the present invention, although theoretically a yarn path of the weft Twf is positioned by the vertical guide roller 6, the yarn path of the weft Twf may vary by a variation of tension or an operation for engaging the weft to rapier 11. Therefore, it is required that there is no object interfering with the edge of the weft Twf even if the weft moves in its width direction, and for such a requirement, the tension providing mechanism 8 having wide plate springs 8a and 8b is used. The width of the plate spring 8a and 8b may be a value of not less than 5 times of the yarn width of the weft Twf.

The pressing plate guide 9 is disposed at a position of downstream side of the yarn path of the weft Twf in the plate spring tension providing mechanism 8, and it is a plate on which a V-shaped guide surface 9a is formed at its tip portion. This guide 9 operates in accordance with the yarn supply to rapier 11, and it is driven in a frontward/rearward direction shown by an arrow in FIG. 2 utilizing a cam mechanism transmitted with the rotation of the weaving machine.

Figure 5:
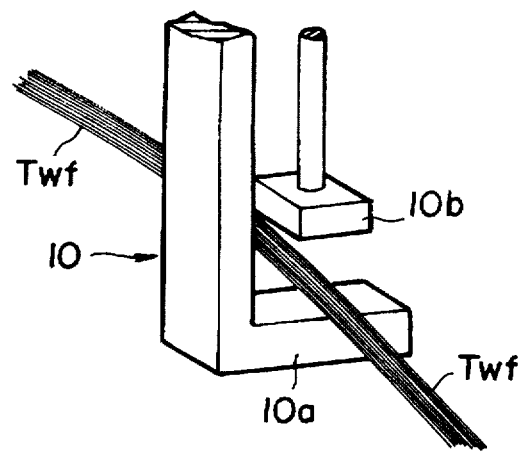
FIG. 5 is en enlarged perspective view of a yarn end holding guide of the apparatus shown in FIG. 2.

Further, a yarn end holding guide 10 is disposed at a position downstream of the pressing plate guide 9. As shown in FIG. 5, the yarn end holding guide 10 comprises a L-shaped receiving member 10a and a pressing member 10b driven in a vertical direction by driving means which is not shown. This guide 10 holds a yarn end until the yarn supply of the weft Twf to rapier 11 is completed, by moving the pressing member 10b downwardly and pressing the weft Twf onto the receiving member 10a.

Figure 6:
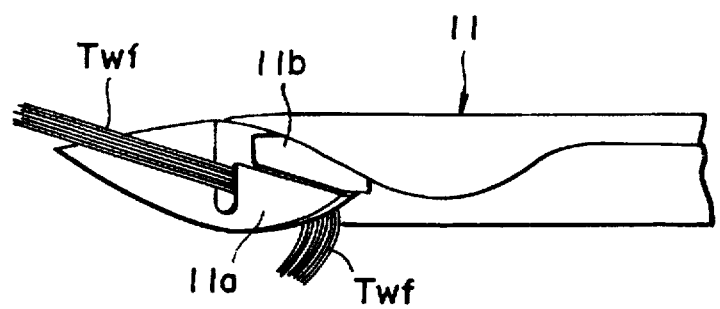
FIG. 6 is an enlarged side view of a tip portion of a rapier of the apparatus shown in FIG. 2.

Therefore, the weft Twf moves downward by a condition where the pressing plate guide 9 is moved in the arrow direction and the flat surface of the weft is guided by an inclined guide surface of the V-shaped guide surface 9a, as well as the the yarn end holding guide 10 is also moved downwardly, the weft crosses the tip portion of rapier 11 without breakage of the flat condition, and as a result, as shown in FIG. 6, the weft is engaged to a claw 11a of the rapier 11 in a good condition.

Where, usually, the weft Twf is held by the yarn end holding guide 10 and a yarn supply guide having a guide hole such that the weft Twf obliquely crosses the rapier 11, and when the rapier 11 reaches a yarn supply position, both guides are moved downwardly to engage the weft Twf to the claw 11a of the rapier 11.

However, if a usual yarn supply guide is used for yarn supply to rapier 11, in a case where the weft Twf is a flat multifilament of carbon fiber, the flat condition is broken because the weft Twf is scrubbed by the above-described guide hole. Therefore, in the apparatus according to the present invention, the pressing plate guide 9 is provided between the plate spring tension providing mechanism 8 and the yarn end holding guide 10, and at the time of yarn supply to rapier 11, the yarn end holding guide 10 is moved downwardly as well as the pressing plate guide 9 is proceeded, whereby the weft Twf is pressed in a direction rearward of the weaving machine so that the weft crosses the rapier 11.

Figure 2:
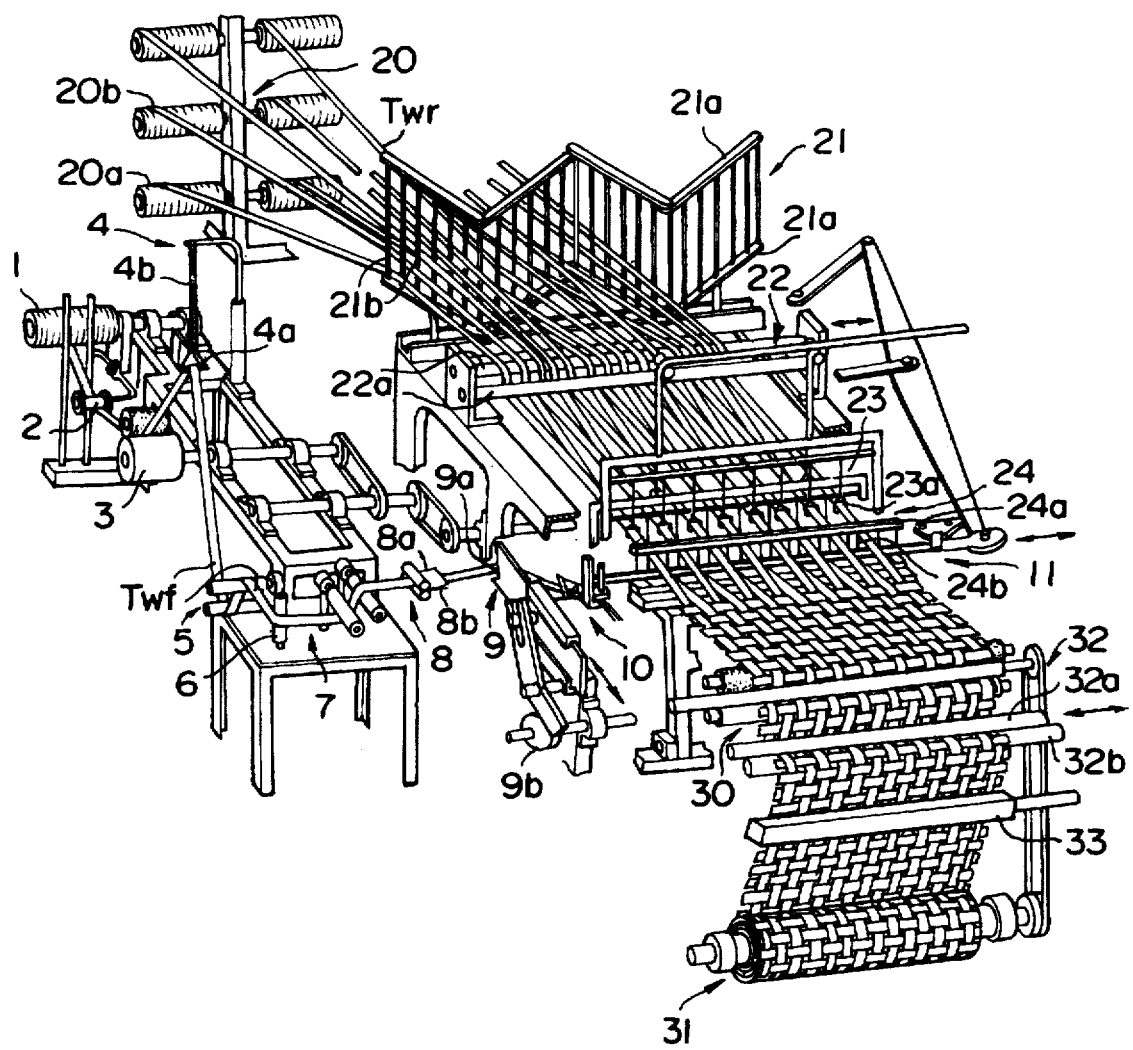
FIG. 2 is a perspective view of an apparatus for manufacturing a reinforcing woven fabric according to an embodiment of the present invention.
Figure 3:
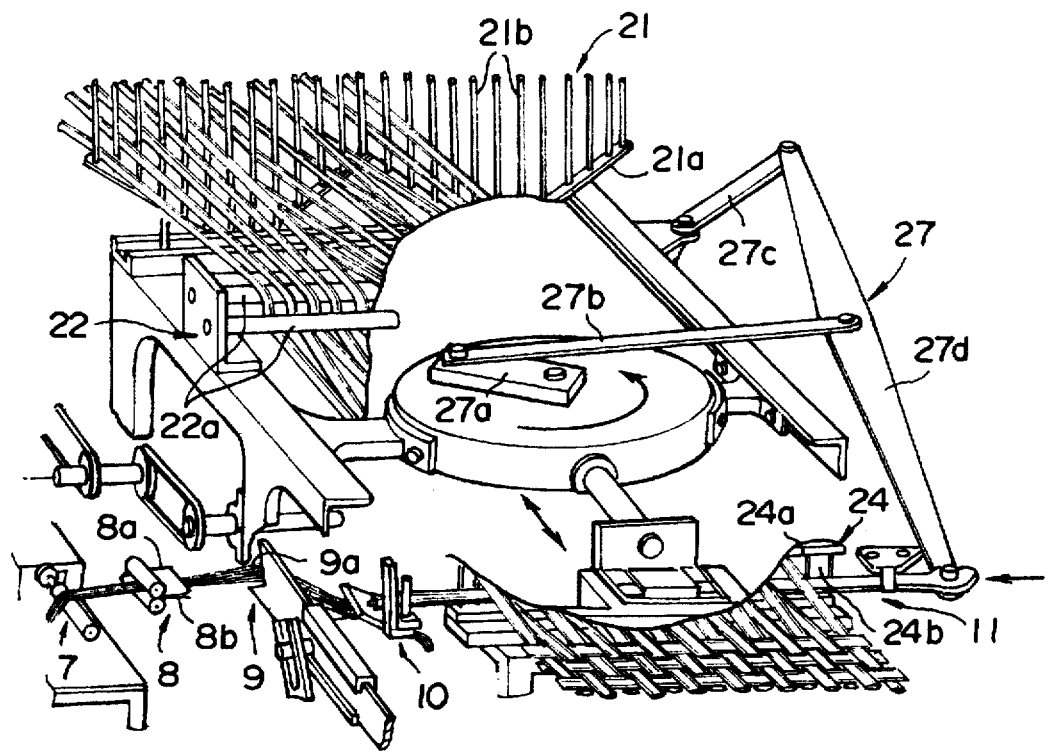
FIG. 3 is an enlarged view of a main portion of the apparatus shown in FIG. 2 showing a drive mechanism of a rapier.
Figure 4:
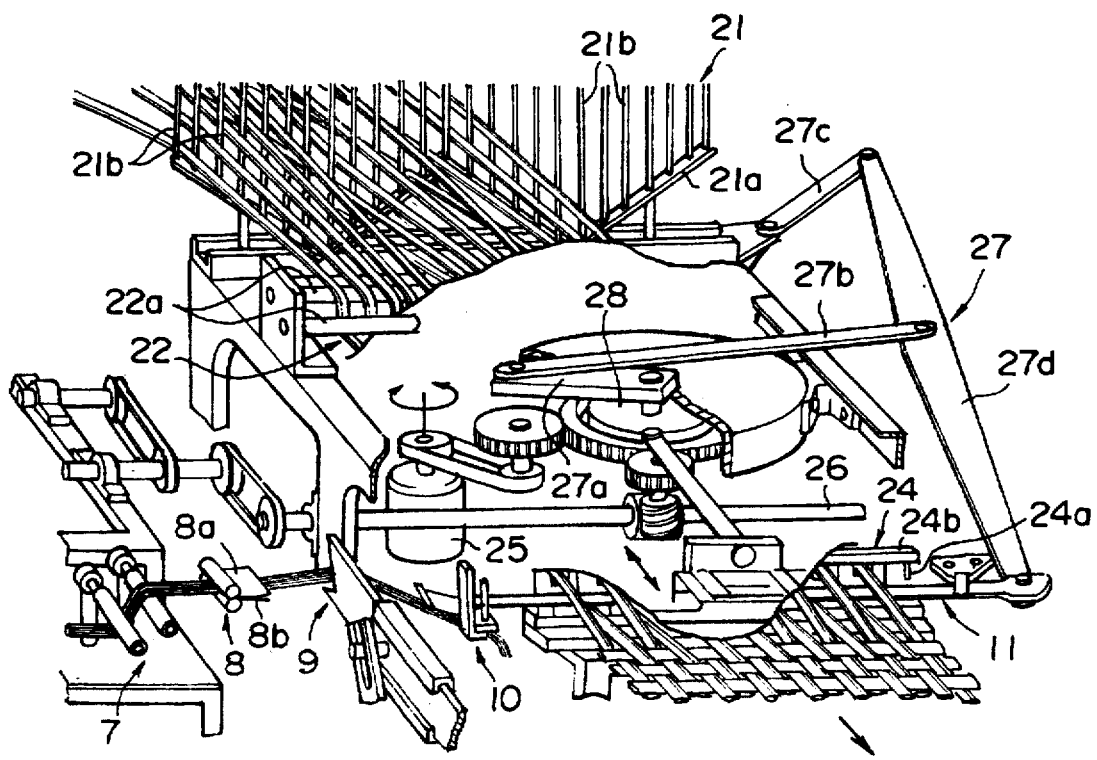
FIG. 4 is an enlarged view showing the portion shown in FIG. 3 in more detail by partially cutting away.

Then, when rapier 11 moves in the right-hand direction in FIG. 2, the weft Twf is engaged to claw 11a of the tip portion of the rapier 11, and the weft is held by being pressed by the pressing member 11b. As shown in FIG. 2, the rapier 11 is a lengthwise member disposed near a reed 24 described later, and it operates intermittently in the left and right-hand directions to insert the weft Twf between many warps Twr. As shown in FIGS. 3 and 4, the rapier 11 operates intermittently by a driving force from a driving motor 25 transmitted via a link mechanism 27 having arms 27a–27d. In the rapier 11, as shown in FIG. 6, claw 11a for engaging the flat weft Twf is provided at its tip portion, and pressing member 11b is attached near the claw 11a.

Figure 7:
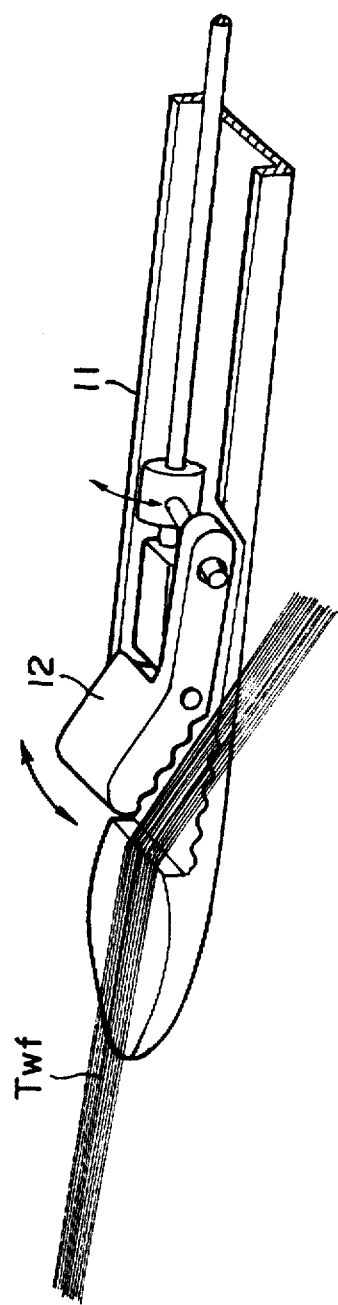
FIG. 7 is a perspective view of a tip portion of a rapier according to another embodiment.

Further, as a method for holding the flat weft Twf by the rapier 11, as shown in FIG. 7, by holding the end portion of the weft Twf guided to the tip portion of the rapier 11 nipping the end portion by a cramping member 12, the insertion of the weft almost without breakage of the flat condition can be achieved.

In the apparatus for manufacturing a carbon fiber reinforcing woven fabric according to this embodiment, by such a weft supplying step of the weft supplying apparatus, the weft Twf wound on the bobbin 1 is unwound by take-off roller 3 at a constant speed, and a looseness caused when the weft is inserted intermittently by the rapier 11 can be absorbed by spring 4b of tension providing mechanism 4.

Then, the weft Twf unwound from bobbin 1 in a radially outer direction is guided by guide rollers 5–7, while the weft is maintained in a condition of a uniform tension by plate spring tension providing mechanism 8, the weft is engaged to claw 11a of the rapier 11 by the cooperation of pressing plat guide 9 and yarn end holding guide 10, and the weft is inserted between many warps Twr shown in FIG. 2. Therefore, the weft Twf comprising a carbon fiber multifilament is not twisted and the flat condition is not broken, and the weft is woven while maintained in such a good condition.

Next, the warp supplying apparatus will be explained. In creels 20, many bobbins 20a are supported at a condition free to be rotated, a warp Twr comprising a flat carbon fiber multifilament is wound on each bobbin 20a similarly to the bobbin 1 in the weft supplying apparatus, and the wefts Twr, after unwound in a radially outer direction, are guided to a cloth fell through a comb 21, a horizontal guide 22, healds 23 and a reed 24.

Where, the unwinding speed of the warp Twr from the bobbin 20a is extremely low as compared with that of the weft Twf, and it may be a constant speed, and therefore, the bobbin 20a may be a bobbin having a weak brake.

In the comb 21, a plurality of members, each having a plurality of vertically extending wires 21b arranged between supporting frames 21a and 21b disposed at upper and lower positions at the same interval as that of the warps Twr, are connected to each other, and the comb positions many warps Twr along a horizontal direction by passing each warp Twr through a position between the wires 21b and 21b one by one to control the arrangement density of the warps Twr to a desired density.

Where, the wires 21b must have an appropriate length so that the flat warps Twr supplied from bobbins 20a and 20b do not come into contact with the supporting frames 21a and 21a and the flat surfaces of the warps Twr come into contact only with the wires 21b. If the length of the wires 21b is less than a predetermined length, the flat condition of the warps Twr is broken. Although the optimum length of the wires 21b is determined by the distances from the creels 20 to the comb 21 and to the horizontal guide 22, it is required to be a length of about 300 mm.

The horizontal guide 22 has two guide bars 22a, and regulates the position of the warps Twr in a vertical direction by winding the warps Twr unwound from bobbins 20a in a condition of S-passage. Where, the flat surface of each warp Twr must be turned at an angle of 90 degrees between the comb 21 and the horizontal guide 22 so that the width direction of the warp Twr is substantially along a horizontal direction. Therefore, the distance between the comb 21 and the horizontal guide 22 is required to be not less than 50 mm although it varies depending ,on the width of the warp Twr. If the distance between the comb 21 and the horizontal guide 22 is less than 50 mm, the warp Twr passes through the guide 22 while twisted and the warp with such a condition is woven.

In this case, the warps Twr can be opened and widened by oscilating one guide bar among the plurality of horizontal guide bars 22a in a horizontal direction (in a direction shown by an arrow in FIG. 2). Since a length difference of yarn between the inner and outer surfaces of each flat warp Twr contacting the guide bars 22a is generated by winding the flat warp Twr on the guide bars 22a at a condition of S-passage and the fibers of the inner surface is loosened and the fibers of the outer surface is stretched, the warp can be opened and the width thereof can be enlarged by oscilating the warp in a horizontal direction, that is, in the width direction of the warp. Although it is preferred that the diameter of the guide bar 22a is as small as possible to increase the length difference of yarn between the inner and outer surfaces of the warp, because the stiffness is also required for the guide bar, in a case of a steel bar, the diameter is preferably in the range of about 15–40 mm. Further, the oscillation speed of the guide bar 22a is preferably in the range of about 0.5–10 times/sec., and the amount of the oscillation is preferably in the range of about 3–10 mm. If the oscillation speed is over 10 times/sec. and the amount of the oscillation is over 10 mm, the carbon fibers are scrubbed by the guide bar 22a and fluffs are generated, and such a condition is not preferred. On the other hand, if the oscillation speed is less than 0.5 time/sec. and the amount of the oscillation is less than 3 mm, the warp Twr is not sufficiently opened and widened.

In a case where the carbon fiber filamentary yarn is opened and widened by oscillation of a plurality of horizontal guide bars 22a, the respective guide bars 22a are separated from each other at an appropriate distance so as to prevent generation of fluffs caused by nipping the woven fabric by these guide bars 22a. In a case where the horizontal guide bars 22a comprise two bars, one is fixed and the other is oscilated. Alternatively, two bars may be both oscilated so that the respective bars are moved in directions contrary to each other. In a case of three bars, a central bar may be oscilated, or three bars may be oscilated so that the other two bars are moved in a reverse direction to the oscillation direction of the central bar. Further, these guide bars may be rotated by the running of the warps, or may be stopped in rotation.

Although the guide bars 22a have both the function of regulating the vertical position of the warps Twr and the function of opening and widening the warps Twr by oscillation in the above explanation, it may be constituted that a guide bar 22a for regulating the vertical position of the warps Twr and another guide bar disposed between this guide bar 22a and the heald 23 for opening and widening the warps Twr by oscillation are provided separately.

The heald 23 is disposed for each of the warps Twr, it guides each warp Twr positioned by the horizontal guide 22 in a vertical direction to the reed 24, it is driven in a vertical direction by a driving means which is not shown in the figure, and it forms a shed between the warps Twr present downstream of the reed 24 into which the weft Twf is inserted.

In a conventional heald, mails are formed as a lengthwise shape in a vertical direction for the purpose of suppressing the interference between an adjacent yarn and the heald. However, if a flat yarn is passed through such a lengthwise mail, the flat condition is broken and weaving while maintaining the flat condition cannot be done. Therefore, it is preferred that the mail 23a of the heald 23 is formed as a long shape in a horizontal direction, and the length of the mail 23a in the horizontal direction is set to be the same length as the width of the carbon fiber multifilament yarn used as the warp Twr or slightly greater. The shape of the mail 23a is preferably a rectangle or a long oval.

The reed 24 arranges many warps Twr unwound from bobbins 20a attached to creels 20 at a predetermined arrangement density as well as presses the weft Twf inserted into the shed to the cloth fell, and in the reed, many dents of reed 24b are disposed in a frame 24a in a vertical direction. As shown in FIG. 4, the reed 24 is reciprocated in a direction shown by an arrow in FIG. 4 of the running direction of the warps Twr by a cam 28 to which the rotation of a driving motor 25 is transmitted, and by such an operation, the weft Twf is pressed to the cloth fell.

Where, it is preferred that the tension of the warps Twr is set as low as possible. This is because, even if the position of the warp Twr guided by heald 23 slightly shifts in a horizontal direction and comes into contact with reed 24, the flat condition of the warp Twr controlled at a low tension is not broken, and even if the position of the warp Twr shifts by shaking of the heald 23 and the warp Twr is put aside relative to the mail 23a, the flat condition is not broken.

In the above-described warp supplying apparatus, according to the following steps, the warps Twr are arranged at a predetermined density, and the weft Twf sent from the weft supplying apparatus is pressed to the cloth fell to weave a carbon fiber reinforcing woven fabric.

Firstly, the warps Twr are unwound in a radially outer direction from many bobbins 20a attached to creels 20, respectively. Each warp Twr is positioned by comb 21 in a horizontal direction, and thereafter, 90° turn is provided thereto and it is introduced into horizontal guide 22.

After the many warps Twr introduced into the horizontal guide 22 are positioned by guide bars 22a and 22a in a vertical direction, every other warp is guided to each heald 23 driven in a vertical direction by a driving means which is not shown in the figure, and a shed is formed between the warps Twr present downstream of reed 24 for being inserted with the weft Twf. Thus, many warps Twr unwound from many bobbins 20a attached to creels 20 are arranged at a predetermined density and guided to the cloth fell.

Then, when a shed is formed by the heald 23, the weft Twf is inserted between the warps Twr by the intermittent operation of rapier 11, the inserted weft Twf is pressed to the cloth fell by the reed 24, and as shown in FIG. 2, a carbon fiber reinforcing woven fabric is being woven. By such a wrap supplying step, the wefts Twf are arranged at an identical interval to form a sheet, and a stable weaving becomes possible.

Next, a method for opening and widening the weaving threads after weaving the above-described carbon fiber reinforcing woven fabric will be explained.

At least one of the warp Twr and the weft Twf is a flat and substantially nontwisted carbon fiber multifilament, the weft Twf is inserted between the arranged warps Twr, the inserted weft Twf is pressed to the cloth fell by the reed 24, a carbon fiber reinforcing woven fabric is woven, and the woven fabric is taken off by a winding roll 30 and wound on a cross beam 31. Small-diameter rollers 32a and 32b (woven fabric guiding means 32) is attached between the winding roll 30 and the cross beam 31 in parallel to the surface of the woven fabric, the woven fabric is wound on the small-diameter rollers 32a and 32b at a condition of S-passage, and the small-diameter rollers are oscilated in a direction along the surface of the woven fabric to provide an oscilating motion to the woven fabric. As to the oscilated small-diameter rollers, it is required that at least one roller is provided, and in a case of one small-diameter roller, guide bars are provided before and after the small-diameter roller and the woven fabric is wound on the roller at an S-passage condition, the small-diameter roller is oscilated to give an oscilating motion to the woven fabric, and thereby the warps Twr and the wefts Twf can be opened and widened. A length difference of yarn is generated between the inner and outer surfaces of the weaving thread contacting the roller by winding the woven fabric on the small-diameter roller at an S-passage condition, the fibers on the inner surface are loosened and the fibers on the outer surface are stretched, and therefore, by oscilating the woven fabric at such a condition, the warps Twr and the wefts Twf of the woven fabric are opened and widened.

Although it is preferred that the diameter of the small-diameter roller is as small as possible to increase the length difference of yarn between the inner and outer surfaces of the warp, because the stiffness is also required for the roller, in a case of a steel roller, the diameter is preferably in the range of about 15–40 mm. Further, the oscillation speed of the small-diameter roller is preferably in the range of about 0.5–10 times/sec., and the amount of the oscillation is preferably in the range of about 3–10 mm. If the oscillation speed is over 10 times/sec. and the amount of the oscillation is over 10 mm, the carbon fibers are scrubbed by the small-diameter roller and fluffs are generated, and such a condition is not preferred. On the other hand, if the oscillation speed is less than 0.5 time/sec. and the amount of the oscillation is less than 3 mm, the weaving threads are not sufficiently opened and widened.

Here, a condition where the small-diameter rollers 32a and 32b are attached in parallel to the surface of the woven fabric and in a direction in which the weft Twf extends is particularly effective for opening and widening of the warps Twr. Further, if the small-diameter rollers are attached in parallel to the surface of the woven fabric and in a direction oblique relative to the weft Twf, for example, in a 45° direction, it can be done to open and widen the warps Twr and the wefts Twf simultaneously.

In a case where the carbon fiber filamentary yarns are opened and widened by the oscilating operation of a plurality of small-diameter rollers 32a and 32b, in order to prevent the generation of fluffs caused by a condition where the woven fabric is nipped by these small-diameter rollers 32a and 32b or guide bars, the respective small-diameter rollers 32a and 32b or guide bars are provided at a separate condition. In a case of two small-diameter rollers, one is fixed in oscilating motion and the other is oscilated. Alternatively, two small-diameter rollers may be both oscilated so that the respective rollers are moved in directions contrary to each other. In a case of three small-diameter rollers, a central small-diameter roller may be oscilated, or three rollers may be all oscilated so that the other two rollers are moved in a reverse direction to the oscillation direction of the central roller. Further, if these small-diameter rollers can be rotated by the running of the woven fabric, a disturbance of the texture of the woven fabric does not occur, and it is preferred.

Next, another method for opening and widening weaving threads of a reinforcing woven fabric will be explained. This method is applied together with the above-described method in this embodiment.

A nozzle device 33 having many nozzle holes arranged along the surface of the woven fabric is attached between the cloth fell and the winding roll 30 or between the winding roll 30 and the cross beam 31, and the warps Twr and the wefts Twf of the woven fabric can be opened and widened by injecting a fluid therefrom. Although the fluid may be air or water, in a case of air, because the mass of the fluid is small, in order to increase the effect for opening and widening it is required to inject the fluid by approaching the nozzle holes to the surface of the woven fabric as near as possible. The preferred distance is in the range of about 1–5 mm, and if approached too near the woven fabric, the nozzle device 33 may come into contact with the woven fabric at the time of variation of tension during weaving or operation for recovering a trouble, and such a condition is not preferred. If the distance is over 5 mm, the pressure of air reduces before reaching the surface of the woven fabric and the function for opening and widening decreases. In the nozzle device 33 used in the present invention, the diameter of the nozzle holes is in the range of about 0.1–0.7 mm, the pitch thereof is in the range of about 2–10 mm, and the injection pressure of the fluid is in the range of about 4–15 kg/cm². Further, in a case where the fluid is water, the diameter of the nozzle holes is in the range of about 0.05–0.5 mm, the pitch thereof is in the range of about 0.5–5 mm, and the injection pressure of the fluid is in the range of about 2–6 kg/cm². The distance from the surface of the woven fabric to the nozzle holes is not necessary to be set so small because the mass of water is great as compared with that of air, and it may be set in the range of about 5–30 cm.

By fixing the nozzle device 33 whose nozzles are arranged in the weft arrangement direction and injecting a fluid therefrom, particularly the wefts of the woven fabric can be opened and widened. Further, if the nozzle device 33 is oscilated in the weft arrangement direction, the warps Twr and the wefts Twf of the woven fabric are simultaneously opened and widened and such a condition is effective. In such a case, the oscillation speed is in the range of about 1–30 times/sec., and the amount of the oscillation is in the range of about 3–20 mm.

Although the surface of the woven fabric moves away from the position of the nozzle by the flow of the fluid injected from the nozzle and whereby the effect for opening and widening the warps and wefts of the woven fabric is decreased, in such a case, a wire mesh may be provided at a position opposite to the position of the nozzle relative to the woven fabric and the woven fabric may be brought into contact with the wire mesh, thereby maintaining the distance between the nozzle and the woven fabric. Further, in a case where the woven fabric is a woven fabric easily disturbed in texture, a roll having slits may be provided instead of the wire mesh and the injected fluid may be passed through the slits.

Further, because the condition of a sizing agent affects the warps or the opening condition of the warps and wefts of the woven fabric, if the warps or the woven fabric is opened at a heated condition at a temperature of 40°–150° C., the sizing agent is softened and the bonding between the filaments of reinforcing fiber becomes weak, and therefore, the opening effect can be further increased and a woven fabric having a great covering factor can be obtained.

In the above-described opening and widening of the weaving threads of the woven fabric, although the oscillation method using small-diameter rollers or the fluid injection method using nozzles may be applied individually, these methods can be together applied in the present invention. Further, in the above-described opening and widening of the weaving threads of the woven fabric, although it has been explained as to a case where it is performed in a condition of on-line of the weaving machine, it may be done in another process after the woven fabric has been formed on the weaving machine.

Although there is a case where the degree of opening and widening of warps and wefts of a woven fabric varies depending upon the method for opening and widening warps using guide bars and the method for opening and widening weaving threads of a woven fabric and the hook drop value may vary, in the present invention, the hook drop values of warps and wefts may be in the range of 400–800 mm.

Further, in the above-described methods, if a woven fabric is formed using warps and/or wefts which are nontwisted and flat carbon fiber multifilaments having a hook drop value of 400–800 mm, because it is easily opened and widened by oscillation or fluid injection, the effect for opening and widening the warps and/or wefts can be further increased.

Thus, in the method and apparatus for manufacturing a reinforcing woven fabric according to the present invention, warps and wefts comprising flat and substantially non-twisted carbon fiber multifilaments having a great size and a hook drop value in the specified range are woven as a thin reinforcing woven fabric having a uniform fiber density while maintaining the flat condition. In such a woven fabric, as shown in FIG. 8, almost no crimp appears at the intersections of warps Twr and wefts Twf.

Figure 8:
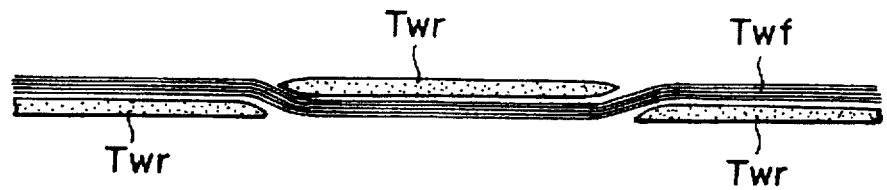
FIG. 8 is a partial vertical sectional view of a reinforcing woven fabric formed using warps and wefts each comprising a single flat reinforcing filamentary yarn according to the present invention.

FIG. 8 shows an enlarged section of a carbon fiber woven fabric, and the carbon fiber filamentary yarns forming the warps and wefts are shown exaggeratedly and schematically as compared with the actual ones.

Further, the weaving using warps and wefts formed by laminating a plurality of unit carbon fiber filamentary yarns is performed as follows.

Namely, with respect to weft, two or three bobbins 1 are prepared, a weft Twf unwound from each bobbin 1 is used as a unit carbon fiber filamentary yarn, and after two or three wefts Twf are guided to take-off roller 3 so that they are laminated on the take-off roller 3, the laminated weft is introduced from tension providing mechanism 4 into plate spring tension providing mechanism 8. Then, by inserting the laminated weft Twf between many warps Twr using rapier 11, the laminated weft Twf can be inserted between the warps Twr without breaking the flat condition.

On the other hand, as to warp, the unit carbon fiber filamentary yarns unwound from two or three bobbins 20a are laminated to form each warp Twr, and after the laminated warps Twr are passed between and through wires 21b and 21b of comb 21, they are introduced into portions between dents 24b and 24b of reed 24 through heald 23.

In the above-described method and apparatus for manufacturing a reinforcing woven fabric according to the present invention, in such a manner, warps Twr and wefts Twf each formed by laminating a plurality of unit carbon fiber filamentary yarns are woven to obtain a reinforcing woven fabric.

Figure 9:
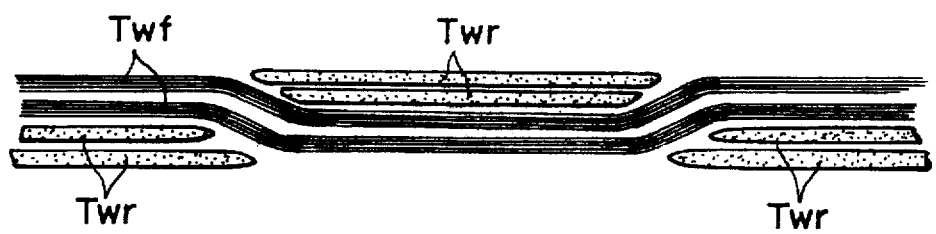
FIG. 9 is a partial vertical sectional view of a reinforcing woven fabric formed by using warps and wefts each formed by laminating two flat reinforcing filamentary yarns according to the present invention.

In the reinforcing woven fabric thus woven using warps Twr and wefts Twf each formed by laminating two unit carbon fiber filamentary yarns, as shown in FIG. 9, it is woven at a uniform fiber density and almost no crimp appears at the intersections of warps Twr and wefts Twf.

Figure 10:
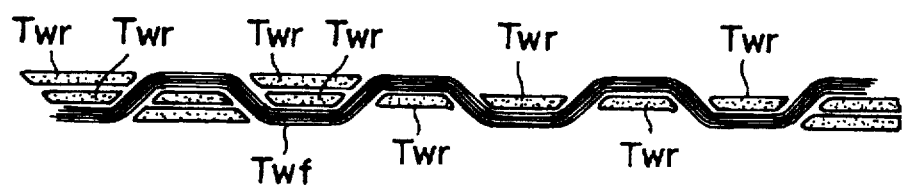
FIG. 10 is a partial vertical sectional view of a reinforcing woven fabric including warps each formed from a single flat reinforcing filamentary yarn and warps each formed by laminating two flat reinforcing filamentary yarns.
Figure 11:
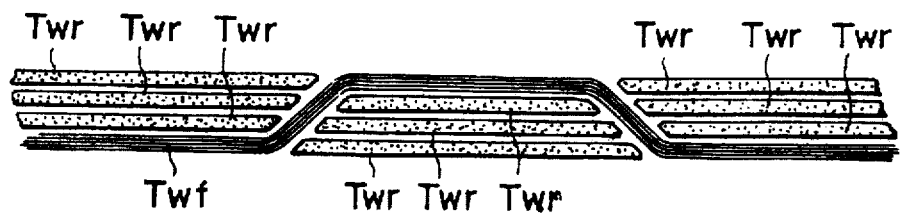
FIG. 11 is a partial vertical sectional view of a reinforcing woven fabric including warps each formed by laminating three flat reinforcing filamentary yarns.

The lamination structure can be formed as various formations. For example, as shown in FIG. 10, the warps Twr each formed by two laminated yarns and the warps Twr each formed as a single layer yarn can be mixed, and as shown in FIG. 11, the warp Twr can be formed by three or more laminated yarns. In any formation, because a flat weaving thread is used, crimp can be suppressed extremely small.

Figure 12:
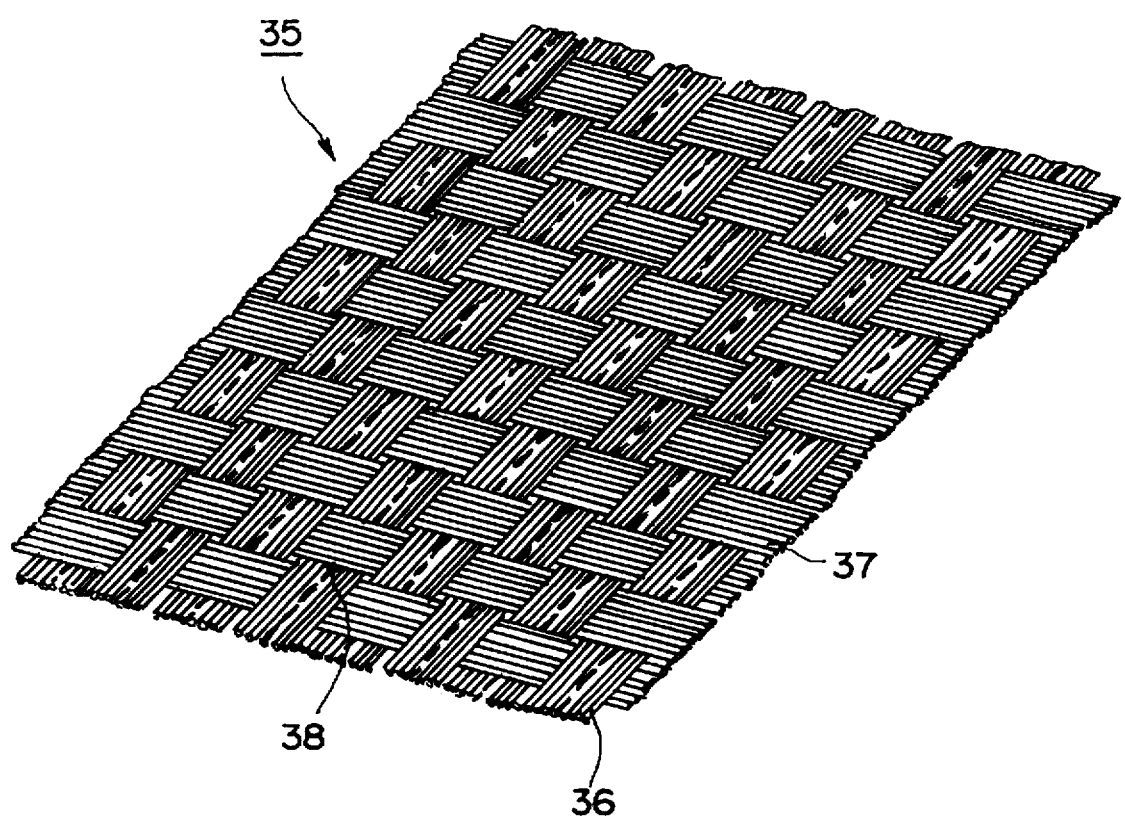
FIG. 12 is a partial perspective view of a reinforcing woven fabric applied with bonding.

Further, in the reinforcing woven fabric according to the present invention, it is preferred that the warps and the wefts are bonded at their intersections. FIG. 12 shows an example of such a bonded reinforcing woven fabric 35. In this example, low-melting point polymer yarns 38 are disposed in parallel to the warps 36, the low-melting point polymer yarns 38 are controlled in a condition extending intermittently by heating, and the warps 36 an d the wefts 37 are bond ed at their intersections by the low-melting point polymer.

The reinforcing woven fabric according to the present invention manufactured in the above-described manner is served to forming of various preforms, prepregs and FRPS.

For example, a preform according to an embodiment of the present invention will be explained with reference to FIG. 13.

Figure 13:
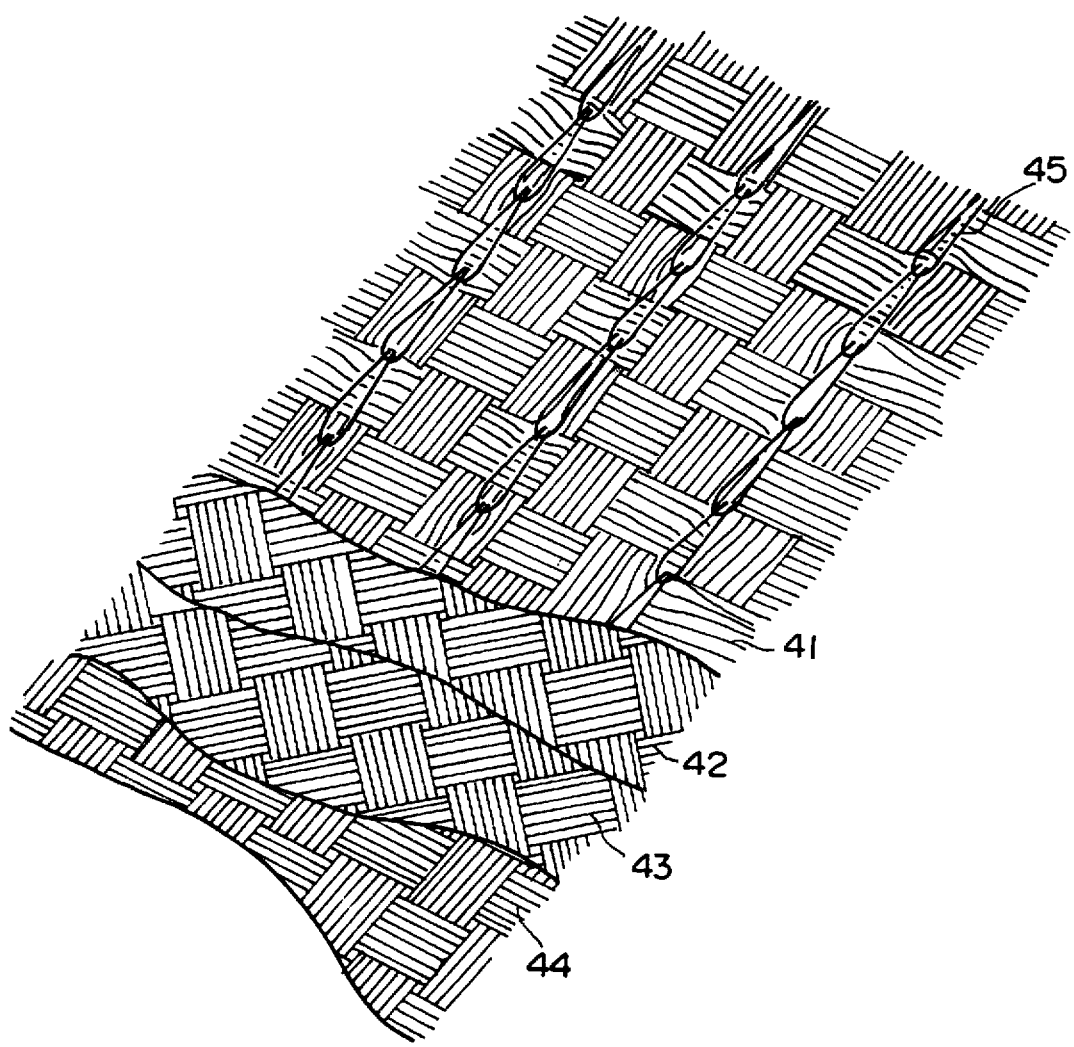
FIG. 13 is an exploded partial perspective view of a preform according to an embodiment of the present invention.

FIG. 13 shows a part of a preform, the preform has four bidirectional carbon fiber woven fabrics 41–44 as woven fabric substrates, and these woven fabrics are stacked in a layer condition. The woven fabrics 41 and 44 and the woven fabrics 42 and 43 are disposed so that the thread directions are the same, respectively, the thread directions of the woven fabrics 41 and 44 and the woven fabrics 42 and 43 are changed by an angle of 45°, and these woven fabrics are disposed so as to be in a mirror symmetry relative to a center of the stacked woven fabrics in the thickness direction. The weaving threads of the woven fabrics comprise a carbon fiber filamentary yarn having a hook drop value of 400–800 mm. The numeral 45 indicates a stitch yarn stitched by chain stitch, and it is formed by two ply yarn. This stitch yarn 45 is stitched by being repeatedly pierced through the stacked woven fabric substrates 41–44 disposed in a layer condition in the thickness direction of the stacked substrates.

In such a preform, because the woven fabrics forming reinforcing substrates are thin woven fabrics having a great interval of weaving threads, the force of constraint at the intersections of the warps and wefts is weak, the hook drop value of the weaving thread itself is not less than 400 mm and the carbon fibers can move easily, there is no damage to fibers when stitched, and a substrate capable of manufacturing an excellent fiber reinforced plastic indicating high strength and elastic modulus of carbon fibers can be realized.

Hereinafter, the present invention will be explained in more detail with reference to more specific examples.

EXAMPLE 1

Using a flat and nontwisted carbon fiber filamentary yarn having a number of carbon fiber filaments of 12,000, a size of 7,200 deniers, a tensile strength at break of 500 kg·f/mm$^2$, a tensile elastic modulus of 23,500 kg·f/mm$^2$, a tensile elongation at break of 2.1%, a yarn width of 6.5 mm and a hook drop value of 571 mm whose formation is maintained by providing a sizing agent of 0.2 wt. % as warps and wefts, a carbon fiber reinforcing woven fabric according to the present invention was woven by the following manufacturing method and apparatus according to the present invention while opening and widening the warps and wefts.

100 flat warps were unwound from creels in a radially outer direction so that they were not twisted, the width direction of each warp was converted into a vertical direction by bringing the warps into contact with wires of a comb, after arranging them at a arrangement density of 1.0 warp/cm, they were wound on two steel guide bars each having a diameter of 27 mm at a condition of S-passage, and the width direction of each warp was converted into a horizontal direction. The warps were opened and widened by oscilating one of the guide bars in a horizontal direction at an amount of oscillation of 5 mm and an oscillation speed of 5 times/sec. Then, the respective warps were passed through mails lengthwise in a horizontal direction and arranged at a density of 1.0 mail/cm which was provided in a heald, then through a reed, and the opened and widened flat warps were introduced into a shed.

On the other hand, a weft was unwound from a bobbin in a radially outer direction by a take-off roller at a constant speed, and the weft was guided through a guide of a tension providing mechanism to a horizontal guide roller, a vertical guide roller and a horizontal guide roller such that the flat condition of the weft was not broken.

A shed was formed by the vertical motion of the heald, the weft was inserted into the shed while holding the weft by a rapier to weave a woven fabric, the woven fabric was wound onto a winding roll, then the woven fabric was passed through two steel small-diameter rollers each having a diameter of 27 mm at a condition of S-passage, and the warps and wefts of the woven fabric were opened and widened by oscilating one of the small-diameter rollers at an amount of oscillation of 5 mm and an oscillation speed of 10 times/sec. in a horizontal direction. Then, the warps and wefts of the woven fabric were further opened and widened by oscilating a nozzle device (diameter of nozzle hole: 0.3 mm, nozzle pitch: 5 mm), which was provided at a position of 2 mm from the surface of the woven fabric, at an amount of oscillation of 5 mm and an oscillation speed of 5 times/sec. in a direction along the wefts and injecting air jet from the nozzle at an injection pressure of 7 kg/cm$^2$, and thereafter the woven fabric was wound on a cross beam to prepare a carbon fiber reinforcing woven fabric according to the present invention. Although the flat condition of the weft was disturbed when the weft was inserted into the shed because the amount of the sizing agent provided to the carbon fiber filamentary yarn was small, it could be sufficiently widened by injecting the air jet onto the woven fabric.

Figure 1B:
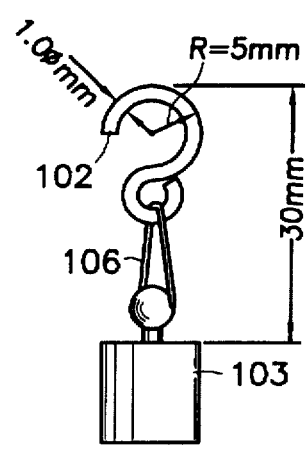
Figure 1C:
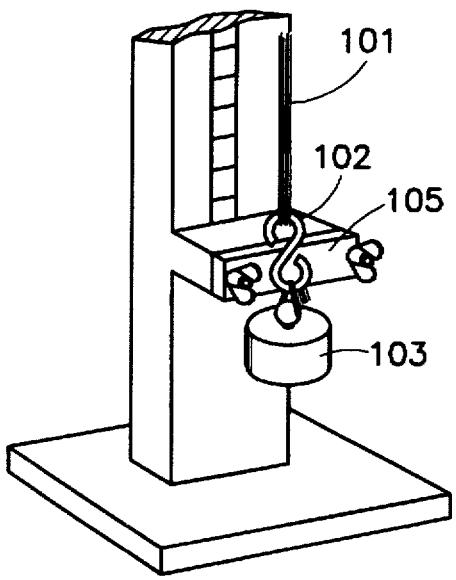

In the obtained carbon fiber reinforcing woven fabric, drying was not required, the amount of sizing agent provided to the woven fabric was the same as the amount of sizing agent provided to the yarns used for forming the woven fabric, and fluffs due to the opening and widening were not generated and the surface of the woven fabric was very clean. Further, the woven fabric obtained had a plain weave structure at a density of warps and wefts of 1.0 yarn/cm and the respective widths of the warps and the wefts of 9.5 mm and 9.9 mm, and the widths were enlarged as compared with those of original yarns used for weaving the woven fabric. Furthermore, the respective yarn thicknesses of the wraps and the wefts were 0.080 mm and 0.080 mm, the respective ratios of width/thickness were 119 and 124, the respective ratios of pitch of threads/width of yarn of the warps and the wefts were 1.00 and 1.01, the thickness of the woven fabric was 0.16 mm, the weight of the woven fabric was 160 g/m$^2$, the fiber density was 1.00 g/cm$^3$ and the width of the woven fabric was 100 cm. The carbon fibers of the flat threads were controlled in a condition where the fibers could be easily moved by releasing of the force of constraint of the fibers by the operation of opening and widening of the warps and wefts, the hook drop value of the warps was 614 mm and that of the weft was 580 mm. The hook drop value was determined by releasing the threads from the obtained woven fabric so that they were not twisted and measuring the value by the method shown in FIG. 1.

In this carbon fiber reinforcing woven fabric, a twist due to unwinding from a bobbin did not occur in both the warps and wefts, the covering factor was 100% and there was almost no gaps, and a woven fabric having a uniform fiber density and a flat surface could be obtained.

Further, with respect to the weaving speed of this carbon fiber reinforcing woven fabric, in a case of a plain weave of densities of warps and wefts of 4.0 yarn/cm using a carbon fiber filamentary yarn of a number of carbon fiber filaments of 3,000 and a size of 1,800 deniers, because the density of the threads was ¼ as compared with a conventional carbon fiber reinforcing woven fabric having a weight of woven fabric of 160 g/m$^2$, the weaving speed of this woven fabric was a high speed of 4 times the conventional woven fabric, and whereby the productivity was remarkably improved. These results are shown in Table 1.

Next, an epoxy resin having an elongation of 3.5% was impregnated into the obtained carbon fiber reinforcing woven fabric to prepare a prepreg. In this prepreg, similarly to the carbon fiber reinforcing woven fabric, the surface was flat, and when the surface of the cross section of a laminated plate was observed by a microscope, the carbon fibers were uniformly distributed and voids were not observed.

Then, four prepregs prepared in the above were stacked in an identical direction and a CFRP was formed by autoclave molding method, and the tensile strength at break and the tensile elastic modulus thereof were determined based on the CFRP tensile testing method of ASTM-D-3039. The result is shown in Table 2 together with the volume content of carbon fibers.

Comparative Example 1-1

Using a carbon fiber filamentary yarn having the same conditions as those of Example 1 other than an amount of provided sizing agent of 1.0 wt. % and a hook drop value of 320 mm, a carbon fiber woven fabric was prepared by the same method and apparatus as those of Example 1.

The arrangement densities of warps and wefts, the widths, the thicknesses, the ratios of yarn width/yarn thickness, the ratios of pitch/yarn width of warps and wefts, the thickness of woven fabric, the weight of woven fabric, the fiber density and the hook drop values of warp and weft of the carbon fiber reinforcing woven fabric obtained are shown in Table 1.

In this carbon fiber reinforcing woven fabric, although the warps and wefts were not twisted by unwinding from bobbins, because the amount of the provided sizing agent was great, even if the opening and widening operation was applied to the warps and the woven fabric, the force of constraint of carbon fibers was not released, and the widths of the warps and the wefts of the woven fabric were almost the same as those of the threads used for weaving. Therefore, the covering factor was 88% and the gap portions were great, and the fiber density was not uniform and the surface of the woven fabric had concavities and convexities.

An epoxy resin was impregnated into this woven fabric to form a prepreg in a manner similar to that of Example 1. At that time, resin present in the gap portions of the woven fabric was taken off by a releasing film and lack of resin occurred in those portions, and therefore, a resin had to be charged into those portions by an amount corresponding to the lack. Four prepregs thus prepared were stacked in an identical direction in the same manner as that of Example 1 and a CFRP was formed by autoclave molding method. In the obtained CFRP, the surface was depressed at the portions corresponding to the gap portions of the woven fabric and the surface had concavities and convexities, and when the surface of the cross section of a laminated plate was observed by a microscope, the distribution of the carbon fibers was not uniform and many voids were observed.

Further, with this CFRP, the tensile strength at break and the tensile elastic modulus thereof were determined by the same method as that of Example 1. The result is shown in Table 2 together with the volume content of carbon fibers. In the obtained CFRP, the practical data of carbon fiber volume content was 45%.

Comparative Example 1-2

Using the same carbon fiber filamentary yarn as that of Example 1 as warps and wefts, a carbon fiber woven fabric was prepared by the same method and apparatus as those of Example 1 without performing opening and widening of the warps and opening and widening of the warps and wefts of the woven fabric.

The arrangement densities of warps and wefts, the widths, the thicknesses, the ratios of yarn width/yarn thickness, the ratios of pitch/yarn width of warps and wefts, the thickness of woven fabric, the weight of woven fabric, the fiber density and the hook drop values of warp and weft of the carbon fiber reinforcing woven fabric obtained are shown in Table 1.

In this carbon fiber reinforcing woven fabric, although the warps and wefts were not twisted by unwinding from bobbins, because the amount of the provided sizing agent was small, the flat condition of the wefts was broken, and particularly, the width of the wefts of the woven fabric was decreased as compared with the width of the yarn used for weaving. Therefore, the covering factor was 82% and the gap portions were further enlarged as compared with those of the woven fabric obtained in Comparative Example 1-1, and the fiber density was not uniform and the surface of the woven fabric had concavities and convexities.

An epoxy resin was impregnated into this woven fabric to form a prepreg in a manner similar to that of Example 1. At that time, resin present in the gap portions of the woven fabric was taken off by a releasing film and lack of resin occurred in those portions, and therefore, a resin had to be charged into those portions by an amount corresponding to the lack. The lack of resin was greater than that of Comparative Example 1-1. Four prepregs thus prepared were stacked in an identical direction in the same manner as that of Example 1 and a CFRP was formed by autoclave molding method. In the obtained CFRP, the surface was depressed at the portions corresponding to the gap portions of the woven fabric and the surface had concavities and convexities, and when the surface of the cross section of a laminated plate was observed by a microscope, the distribution of the carbon fibers was not uniform and many voids were observed.

Further, with this CFRP, the tensile strength at break and the tensile elastic modulus thereof were determined by the same method as that of Example 1. The result is shown in Table 2 together with the volume content of carbon fibers. In the obtained CFRP, the practical data of carbon fiber volume content was 42%.

TABLE 1

| | Item | Example 1 | Example 2 | Comparative Example 1-1 | Comparative Example 1-2 | Comparative Example 2 |
|---|---|---|---|---|---|---|
| Carbon fiber filamentary yarn | number of filaments (number) | 12,000 | 12,000 | 12,000 | 12,000 | 12,000 |
| | width of yarn(mm) | 6.5 | 6.5 | 6.5 | 6.5 | 6.5 |
| | twist | none | none | none | none | none |
| | size (denier) | 7,200 | 7,200 | 7,200 | 7,200 | 7,200 |
| | hook drop value (mm) | 571 | 571 | 320 | 571 | 320 |
| | amount of provided sizing agent (wt. %) | 0.2 | 0.2 | 1.0 | 0.2 | 1.0 |
| Properties of woven fabric | twist by unwinding | none | none | none | none | none |
| | width of yarn(mm) | | | | | |
| | warp | 9.5 | 11.9 | 6.9 | 6.1 | 7.5 |
| | weft | 9.9 | 13.0 | 6.5 | 5.3 | 6.8 |
| | ratio of width/thickness | | | | | |
| | warp | 119 | 175 | 53 | 47 | 65 |
| | weft | 124 | 210 | 50 | 33 | 59 |
| | ratio of pitch of threads/width of yarn (mm) | | | | | |
| | warp | 1.00 | 1.12 | 1.45 | 1.64 | 1.78 |
| | weft | 1.01 | 1.03 | 1.54 | 1.89 | 1.96 |
| | weight of woven fabric (g/m$^2$) | 160 | 120 | 160 | 160 | 120 |
| | thickness of woven fabric(mm) | 0.16 | 0.13 | 0.26 | 0.29 | 0.24 |
| | fiber density | | | | | |

TABLE 1-continued

| Item | Example 1 | Example 2 | Comparative Example 1-1 | Comparative Example 1-2 | Comparative Example 2 |
|---|---|---|---|---|---|
| (g/m³) | 1.00 | 1.08 | 0.62 | 0.55 | 0.50 |
| covering factor (%) | 100 | 100 | 89 | 82 | 62 |
| hook drop value (mm) | | | | | |
| warp | 614 | 640 | 351 | 562 | 355 |
| weft | 580 | 612 | 345 | 541 | 380 |
| flatness of surface | good | good | not good | not good | not good |

TABLE 2

| Item | Example 1 | Comparative Example 1-1 | Comparative Example 1-2 |
|---|---|---|---|
| Carbon fiber volume content (%) | 55 | 45 | 42 |
| Tensile strength at break (kg · f/mm²) | 108 | 75 | 61 |
| Tensile elastic modulus (kg · f/mm²) | 6,800 | 5,500 | 4,800 |

As is evident from the result shown in Table 2, the CFRP manufactured from a carbon fiber reinforcing woven fabric according to the present invention has a extremely high tensile strength at break, and it indicates a very high tensile elastic modulus which cannot be considered in a conventional substrate of carbon fiber woven fabric. In the CFRPS of Comparative Examples 1-1 and 1-2, because the fiber densities of the used reinforcing substrates were small to be 0.62 g/cm³ and 0.55 g/cm³, respectively, as compared with the fiber density of 1.00 g/cm³ of Example 1, the volume content of carbon fibers was low, a matrix resin existed at an greater amount at the gap portions of the woven fabrics, cracks were generated from these portions, and as is evident from the results of Comparative Examples 1-1 and 1-2, the tensile strengths at break thereof were small as compared with that of the CFRP of Example 1.

In the above-described results, the results calculated by converting the carbon fiber volume contents of the CFRPS of Comparative Examples 1-1 and 1-2 into 55% so that the carbon fiber volume contents of the CFRP of Example 1 and the CFRPS of Comparative Examples 1-1 and 1-2 become the same are shown in Table 3.

TABLE 3

| Item | Example 1 | Comparative Example 1-1 | Comparative Example 1-2 |
|---|---|---|---|
| Carbon fiber volume content (%) | 55 | 55 | 55 |
| Tensile strength at break (kg · f/mm²) | 108 | 92 | 80 |
| Tensile elastic modulus (kg · f/mm²) | 6,800 | 6,700 | 6,300 |

As is evident from Table 3, even if compared converting the carbon fiber volume contents into the same value, the tensile strengths of Comparative Examples 1-1 and 1-2 are small. This is considered because a matrix resin existed at an greater amount at the gap portions of the woven fabrics, cracks were generated from these portions and the breakage of the CFRP propagated.

EXAMPLE 2

Using the same carbon fiber filamentary yarn as that of Example 1, a carbon fiber reinforcing woven fabric having a warp arrangement density of 0.75/cm, a weft arrangement density of 0.75/cm and a weight of woven fabric of 120 g/m² was prepared by the same method and apparatus as those of Example 1. The arrangement densities of warps and wefts, the widths, the thicknesses, the ratios of yarn width/yarn thickness, the ratios of pitch/yarn width of warps and wefts, the thickness of woven fabric, the weight of woven fabric, the fiber density and the hook drop values of warp and weft of the carbon fiber reinforcing woven fabric obtained are shown in Table 1.

The widths of the warps and wefts of this woven fabric became greater than the widths of the warps and wefts of the woven fabric of Example 1 in spite of using the same carbon fiber filamentary yarn as that of Example 1, and the covering factor was 100% and there was almost no gaps, and a woven fabric having a uniform fiber density and a flat surface without fluffs could be obtained.

Comparative Example 2

Using a carbon fiber filamentary yarn having the same conditions as those of Example 1 other than an amount of provided sizing agent of 1.0 wt. % and a hook drop value of 320 mm, a carbon fiber reinforcing woven fabric having a warp arrangement density of 0.75/cm, a weft arrangement density of 0.75/cm and a weight of woven fabric of 120 g/m² was prepared by the same method and apparatus as those of Example 2. The arrangement densities of warps and wefts, the widths, the thicknesses, the ratios of yarn width/yarn thickness, the ratios of pitch/yarn width of warps and wefts, the thickness of woven fabric, the weight of woven fabric, the fiber density and the hook drop values of warp and weft of the carbon fiber reinforcing woven fabric obtained are shown in Table 1. In this carbon fiber reinforcing woven fabric, although the warps and wefts were not twisted by unwinding from bobbins, because the amount of the provided sizing agent was great, even if the opening and widening operation was applied to the warps and the woven fabric, the force of constraint of carbon fibers was not released, and the widths of the warps and the wefts of the woven fabric were almost the same as those of the threads used for weaving. Therefore, the covering factor was 62% and the gap portions were great, and the fiber density was not uniform and the surface of the woven fabric had concavities and convexities.

INDUSTRIAL APPLICATIONS OF THE INVENTION

According to the present invention, since a reinforcing woven fabric which is thin, can indicate a high strength and has a extremely high covering factor can be obtained as a reinforcing substrate for composite materials, the reinforcing woven fabric, preform, prepreg and fiber reinforced plastic according to the present invention are extremely useful to uses requiring light-weight and high-strength properties and a high reliability such as various structural materials for aircraft. Further, in the manufacturing method and apparatus according to the present invention, such an excellent reinforcing woven fabric can be manufactured easily and inexpensively.

We claim:

1. A reinforced woven fabric having as weaving threads flat and substantially untwisted multifilaments of reinforcing fibers having less than 0.5 wt. % of sizing agent provided thereon, and bound together with a cohesion of 400–800 mm in hook drop value.

2. The reinforced woven fabric according to claim 1, wherein the thickness of said multifilament reinforcing fibers is in the range of 0.05–0.2 mm and the ratio of width to thickness thereof is in the range of 30–250.

3. The reinforced woven fabric according to claim 2, wherein the ratio of width to thickness of said multifilament reinforcing fibers is more than 150 and not more than 250.

4. The reinforced woven fabric according to any one of claims 1 to 3, wherein said reinforcing woven fabric is a woven fabric with said multifilaments of reinforcing fiber as warps and wefts, wherein the thickness of the woven fabric is in the range of 0.1–0.4 mm, and wherein the weight of said woven fabric is in the range of 100–300 g/m$^2$.

5. The reinforced woven fabric according to any of claims 1 to 3, wherein said reinforcing woven fabric is a unidirectional woven fabric with said multifilaments of reinforcing fiber as warps or wefts and woven with auxiliary yarns, wherein the thickness of said woven fabric is in the range of 0.07–0.3 mm, and the weight of said woven fabric is in the range of 100–320 g/m$^2$.

6. The reinforced woven fabric according to claim 1, wherein said multifilament reinforcing fiber is a carbon fiber filamentary yarn, wherein the number of filaments of said carbon fiber filamentary yarn is in the range of 5,000–24,000, and wherein the size thereof is in the range of 3,000–20,000 denier.

7. The reinforced woven fabric according to any of claims 1 to 3, wherein said reinforcing woven fabric is a woven fabric made of multifilaments of reinforcing fiber as at least one of warps and wefts, at least one of said warp and weft comprises a laminate of a plurality of said multifilaments of reinforcing fiber, wherein the thickness of the woven fabric is in the range of 0.1–0.6 mm, and wherein the weight of said woven fabric is in the range of 200–500 g/m$^2$.

8. The reinforced woven fabric according to claim 1, wherein said multifilament reinforcing fibers are carbon fiber filamentary yarns, wherein the number of filaments of said carbon fiber filamentary yarns is in the range of 3,000–24,000, and wherein the size thereof is in the range of 1,500–20,000 denier.

9. The reinforced woven fabric according to claim 1, wherein said reinforcing woven fabric comprises a plain weave fabric.

10. The reinforced woven fabric according to claim 1, wherein said multifilament reinforcing fibers are carbon fiber filamentary yarns, and wherein said weight of said woven fabric and the size of the carbon fiber filamentary yarn satisfy the following equation, and wherein the covering factor of said woven fabric is in the range of 95–100%, and wherein said equation is:

$$W = k \cdot D^{1/2},$$

Where
W: weight of woven fabric (g/m$^2$)
k: proportional constant (1.4–3.6)
D: size of carbon fiber filamentary yarn (denier).

11. The reinforced woven fabric according to claim 1, and wherein said reinforcing woven fabric is a unidirectional woven fabric with said multifilaments of reinforcing fiber as warps or wefts and woven with auxiliary yarns, wherein the thickness of said woven fabric is in the range of 0.07–0.3 mm, and the weight of said woven fabric is in the range of 100–320 g/m$^2$, and wherein said multifilament of reinforcing fiber is a carbon fiber filamentary yarn, wherein said weight of said woven fabric and the size of said carbon fiber filamentary yarn satisfy the following equation, and wherein the covering factor of the woven fabric is in the range of 95–100%, and wherein said equation is:

$$W = k \cdot D^{1/2},$$

Where
W: weight of woven fabric (g/m$^2$)
k: proportional constant (0.9–4.0)
D: size of carbon fiber filamentary yarn (denier).

12. The reinforced woven fabric according to claim 1, wherein said reinforcing woven fabric is a woven fabric made of multifilaments of reinforcing fiber as at least one of warps and wefts, at least one of said warp and weft comprises a laminate of a plurality of said multifilaments of reinforcing fiber, wherein the thickness of the woven fabric is in the range of 0.1–0.6 mm, and wherein the weight of said woven fabric is in the range of 200–500 g/m$^2$, wherein said multifilament reinforcing fibers are carbon fiber filamentary yarns, wherein said weight of said woven fabric and wherein the size of said carbon fiber filamentary yarns satisfies the following equation, and the covering factor of said woven fabric is in the range of 95–100%, said equation being:

$$W = k \cdot D^{1/2},$$

Where
W: weight of woven fabric (g/m$^2$)
k: proportional constant (2.0–6.0)
D: size of carbon fiber filamentary yarn (denier).

13. The reinforced woven fabric according to claim 1, wherein warps and wefts are bonded to each other at their intersections.

14. A preform formed by stacking a plurality of reinforcing woven fabrics and stitching them together using a stitch yarn, said reinforcing woven fabrics comprising flat and substantially untwisted multifilaments of reinforcing fibers having less than 0.5 wt. % of sizing agent provided thereon, and bound together with a cohesion of 400–800 mm in hook drop value.

15. A preform formed by stacking at least one reinforcing woven fabric comprising flat and substantially untwisted multifilaments of reinforcing fibers having less than 0.5 wt. % of sizing agent provided thereon, and bound together with a cohesion of 400–800 mm in hook drop value and another reinforcing woven fabric and stitching them together using a stitch yarn.

16. The preform according to either one of claims 14 or 15, wherein said stitching using said stitch yarn is performed by chain stitch.

17. The preform according to either one of claims 14 to 15, wherein the tensile elongation at break of said stitch yarn is greater than the tensile elongation at break of said multifilament of reinforcing fiber used for said reinforcing woven fabric.

18. A prepreg prepared by impregnating 30–70 wt. % of matrix resin into a reinforcing woven fabric defined in claim 1.

19. The prepreg according to claim 18, wherein the tensile elongation at break of said matrix resin in a cured or solidified condition is greater than the tensile elongation at break said multifilament reinforcing fiber comprising said reinforcing woven fabric.

20. The prepreg according to claim 18 or 19, wherein said matrix resin is a thermosetting resin having a tensile elongation at break in a cured condition of 1.5–10% or a thermoplastic resin having a tensile elongation at break in a solidified condition of 8–200%.

21. A fiber reinforced plastic comprising:
a reinforcing woven fabric defined in claim 1; and
a matrix resin present in an amount of 30–70 wt. %.

22. The fiber reinforced plastic according to claim 21, wherein the tensile elongation at break of said matrix resin is greater than the tensile elongation at break said multifilament reinforcing fiber of said reinforcing woven fabric.

23. The prepreg according to claim 21, wherein said matrix resin is a thermosetting resin having a tensile elongation at break of 1.5–10% or a thermoplastic resin having a tensile elongation at break of 8–200%.

24. A method for manufacturing a reinforced woven fabric by supplying a plurality of wefts between a plurality of arranged warps comprising supplying a plurality of flat and substantially untwisted multifilaments of reinforcing fiber as at least said warps, providing said warps in an arrangement where the width direction of each warp extends substantially in a vertical direction as well as arranging said warps at a predetermined density in the warp arrangement direction, and thereafter converting the width direction of each warp to substantially a horizontal direction, opening and widening each of said warps with guidance and introducing said warps into a shed forming means.

25. The method according to claim 24, wherein said warps are opened and widened by oscillation of said warp guiding means.

26. A method for manufacturing a reinforced woven fabric comprising the steps of:
weaving a woven fabric of flat and substantially untwisted multifilaments of reinforcing fiber as at least one of warps and wefts; and
thereafter opening and widening said warps and/or wefts of said woven fabric with woven fabric guidance.

27. The method according to claim 26, wherein said warps and/or wefts are opened and widened by oscillation of said woven fabric guiding means.

28. The method according to claim 26, wherein said warps and/or wefts are opened and widened by a fluid injected from a fluid injection means.

29. The method according to claim 28, wherein said fluid injection means is oscilated in a direction along the surface of said woven fabric.

30. A method for manufacturing a reinforced woven fabric of wefts between arranged warps, said method comprising the steps of:
supplying a warp of flat and substantially untwisted multifilaments of reinforcing fiber, keeping the plurality of warps in a disposition wherein the width direction of each warp extends substantially in a vertical direction while arranging said warps at a predetermined density in the warp direction,
thereafter shifting the width direction of each warp to a substantially horizontal direction and forming said shifted warps into a shed;
supplying a weft of flat and substantially untwisted multifilaments of reinforcing fiber, unwinding said weft from a bobbin in a radially outer direction, positioning said weft with guidance so that the width direction of said weft is substantially arranged in a horizontal direction at said weft supplying position, and while storing said weft between said weft unwinding position and said guiding position by a length required for one weft supply motion relative to said warps, supplying said weft between said warps under guidance and tension, and
for opening and widening said warps and said wefts with guidance after weaving said warps and said supplied wefts as a reinforcing woven fabric.

31. The method according to claim 30 wherein said warps and/or wefts are opened and widened by oscillation of said woven fabric guiding means.

32. The method according to claim 30 wherein said warps and/or wefts are opened and widened by a fluid injected from a fluid injection means.

33. The method according to any of claims 24 to 32 wherein the binding property of said multifilament of reinforcing fiber is in the range of 400–800 mm in hook drop value.

34. The method according to any of claims 24 to 32 wherein said multifilament of reinforcing fiber is a carbon fiber filamentary yarn.

35. The method according to claim 34, wherein less than 0.5 wt. % of sizing agent is provided to said reinforcing woven fabric.

36. An apparatus for manufacturing a reinforced woven fabric having means for supplying warps, said warp supply means comprising:
a comb having a plurality of wires for combing a plurality of warps of flat and substantially untwisted multifilaments of reinforcing fiber unwound from bobbins at a predetermined density while keeping the flat condition of each warp as well as arranging and positioning said warps in a condition wherein the width direction of each warp is substantially disposed in a vertical direction;
guide means positioned for displacing the width direction of each warp moving from said comb to an arrangement substantially in a horizontal direction;
warp opening and widening means for opening and widening each said warp moving from said guide by oscillating each warp while keeping the arrangement of said converted width direction of each warp; and
a heald providing an opening and closing motion to said respective warps moving from said warp opening and widening means.

37. An apparatus for manufacturing a reinforced woven fabric comprising means for opening and widening warps and/or wefts of a woven fabric, said woven fabric being woven of flat and substantially untwisted multifilaments of reinforcing fiber as at least one of said warps and wefts.

38. An apparatus for manufacturing a reinforced woven fabric comprising:
a) warp supply comprising:
a comb having a plurality of wires positioned for combing a plurality of warps of flat and substantially untwisted multifilaments of reinforcing fiber unwound from bobbins at a predetermined density while keeping a flat arrangement of each warp as well as keeping said warps in a disposition where the width direction of each warp extends substantially in a vertical direction;

guide means positioned for shifting the width direction of each warp from said comb to a substantially horizontal direction; and a heald providing an opening and closing motion to the respective warps moving from said guide while keeping the disposition of said converted width direction of each warp;

b) a weft supplying means comprising:

a take-off roller positioned for rotating in accordance with the operation of a main shaft of a loom for unwinding a weft of a flat and substantially untwisted multifilament of reinforcing fiber from a bobbin in a radially outer direction at a constant speed;

a guide roller arranged to position said take-off weft so that the width direction of said weft is substantially in a horizontal disposition at a weft supplying position;

a weft storage means connected for supplying said weft to said guide roller while storing said weft between said take-off roller and said guide roller by a length required for one weft supply motion relative to said warps; and a tension providing means for keeping said weft moving from said guide roller in a tense condition; and c) means for opening and widening warps and wefts of the resulting woven fabric.

39. The apparatus according to any of claims 36 to 38, wherein said multifilament of reinforcing fiber is a carbon fiber filamentary yarn.

* * * * *

UNITED STATES PATENT AND TRADEMARK OFFICE
CERTIFICATE OF CORRECTION

PATENT NO.   : 5,783,278
DATED        : July 21, 1998
INVENTOR(S)  : Nishimura et al It is certified that error appears in the above-identified patent and that said Letters Patent is hereby corrected as shown below:

In column 6, line 38, please delete "0" before "means".

Signed and Sealed this

Twelfth Day of January, 1999

Attest:

Attesting Officer

*Acting Commissioner of Patents and Trademarks*